US009637248B2

(12) United States Patent
Cook, Jr. et al.

(10) Patent No.: US 9,637,248 B2
(45) Date of Patent: May 2, 2017

(54) COMPONENT DEPLOYMENT SYSTEM

(71) Applicant: The Boeing Company, Chicago, IL (US)

(72) Inventors: Hugh Quenten Cook, Jr., Foothill Ranch, CA (US); Andrew R. Streett, San Clemente, CA (US)

(73) Assignee: THE BOEING COMPANY, Chicago, IL (US)

( * ) Notice: Subject to any disclaimer, the term of this patent is extended or adjusted under 35 U.S.C. 154(b) by 449 days.

(21) Appl. No.: 14/198,126

(22) Filed: Mar. 5, 2014

(65) Prior Publication Data
US 2014/0263844 A1 Sep. 18, 2014

Related U.S. Application Data

(60) Provisional application No. 61/799,231, filed on Mar. 15, 2013.

(51) Int. Cl.
*B64G 1/24* (2006.01)
*B64G 1/22* (2006.01)
*B64G 1/44* (2006.01)
*H01Q 1/28* (2006.01)
*H01Q 1/08* (2006.01)
(Continued)

(52) U.S. Cl.
CPC .............. *B64G 1/222* (2013.01); *B64G 1/44* (2013.01); *B64G 1/66* (2013.01); *H01Q 1/08* (2013.01); *H01Q 1/288* (2013.01); *H01Q 15/161* (2013.01); *H02S 30/20* (2014.12)

(58) Field of Classification Search
CPC .. B64G 1/222; B64G 1/44; B64G 1/66; H02S 30/20; H01Q 1/288; H01Q 1/08
See application file for complete search history.

(56) References Cited

U.S. PATENT DOCUMENTS 4,373,690 A * 2/1983 Stillman ............... B64G 1/222
136/245
4,587,526 A * 5/1986 Ahl, Jr. .................... B64G 9/00
343/883
(Continued)

FOREIGN PATENT DOCUMENTS

EP 2498334 A1 9/2012
WO WO9907017 A1 2/1999
(Continued)

OTHER PUBLICATIONS

Hall, "Integrated Solar Array and Reflectarray Antenna (ISARA)," National Aeronautics and Space Association, last updated Jul. 2013, 2 pages, accessed Oct. 30, 2013. http://www.nasa.gov/directorates/spacetech/s~~mall_spacecraft/isara_project.html#. UoPGqfmkqZN.

(Continued)

*Primary Examiner* — Philip J Bonzell
(74) *Attorney, Agent, or Firm* — Yee & Associates, P.C.

(57) ABSTRACT

A method and apparatus for deploying a group of panels. An apparatus comprises a group of panels in a folded configuration against a side of a spacecraft, a group of flexible members connected to the group of panels, and an interface system associated with the group of panels and the group of flexible members. The interface system is configured to move the group of panels from the folded configuration to a deployed configuration when the group of flexible members is extended from the spacecraft.

31 Claims, 35 Drawing Sheets

(51) Int. Cl.
*H02S 30/20* (2014.01)
*H01Q 15/16* (2006.01)
*B64G 1/66* (2006.01)

(56) References Cited

U.S. PATENT DOCUMENTS

| | | | | |
|---|---|---|---|---|
| 4,630,791 A | * | 12/1986 | Chapman | B64G 1/14 136/245 |
| 4,725,025 A | * | 2/1988 | Binge | B64G 9/00 136/245 |
| 5,228,644 A | * | 7/1993 | Garriott | B64G 1/443 136/245 |
| 5,494,234 A | * | 2/1996 | Kramer | H01Q 1/30 242/390.2 |
| 5,520,747 A | * | 5/1996 | Marks | B64G 1/222 136/245 |
| 5,522,569 A | * | 6/1996 | Steffy | B64G 1/002 136/245 |
| 5,578,139 A | * | 11/1996 | Jones | B64G 1/44 136/245 |
| 5,833,176 A | * | 11/1998 | Rubin | B64G 1/443 136/245 |
| 6,543,724 B1 | | 4/2003 | Barnett | |
| 6,568,640 B1 | | 5/2003 | Barnett | |
| 6,581,883 B2 | * | 6/2003 | McGee | B64G 1/443 136/245 |
| 7,714,797 B2 | * | 5/2010 | Couchman | B64G 1/66 244/172.6 |
| 8,720,830 B1 | * | 5/2014 | Szatkowski | B64G 1/44 244/172.6 |
| 2003/0015625 A1 | * | 1/2003 | McGee | B64G 1/443 244/172.6 |
| 2007/0262204 A1 | | 11/2007 | Beidleman et al. | |

FOREIGN PATENT DOCUMENTS

| | | |
|---|---|---|
| WO | WO2011006506 A1 | 1/2011 |
| WO | WO2014024199 A1 | 2/2014 |

OTHER PUBLICATIONS

"CanX-7: Deorbiting Demonstration Mission," University of Toronto Institute for Aerospace Studies Space Flight Lab, copyright 2011, 2 pages, accessed Oct. 30, 2013. http://www.utias-sfl.net/nanosatellites/CanX7/.

MacGillivray, "Miniature Deployable High Gain Antenna for CubeSats," The Boeing Company, CubeSat Developers Workshop, Apr. 2011, 11 pages, accessed Oct. 30, 2013. http://mstl.atl.calpoly.edu/~bklofas/Presentations/DevelopersWorkshop2011/47_MacGillivray_Miniature_Antennas.pdf.

"CubeSat," Wikimedia Foundation, Inc., last updated Oct. 2013, 6 pages, accessed Oct. 30, 2013. http://en.wikipedia.org/wiki/CubeSat.

"LightSail-1," European Space Agency, eoPortal, copyright 2013, 5 pages, accessed Oct. 30, 2013. https://directory.eoportal.org/web/eoportal/satellite-missions/l/lightsail-1.

Babuscia et al., "Inflatable Antenna for CubeSat: Motivation for Development and Initial Trade Study," iCubeSat 2012, Interplanetary CubeSat Workshop, May 2012, 19 pages, accessed Oct. 30, 2013. http://icubesat.files.wordpress.conn/2012/06/icubesat-org-2012-a-2-2-_presentation_babuscia_201205281329.pdf.

Blevins, "Small Spacecraft Antenna Selection Tutorial," AIAA Conference on Small Satellites, Reference: ADC-0807201305, Aug. 1999, revised Jul. 2008, 20 pages, accessed Oct. 30, 2013. http://www.antdevco.com/ADC-0807201305%20-%20R0%20Small%20Spacecraft%20Antenna%20Selection%20Tutorial.pdf.

Thomson, "Mechanical vs. Inflatable Deployable Structures for Large Apertures or Still No Simple Answers," California Institute of Technology, presented to the Keck Institute for Space Sciences Large Space Apertures Workshop, Nov. 2008, 24 pages, accessed Oct. 30, 2013. http://www.kiss.caltech.edu/workshops/apertures2008/talks/thomson.pdf.

Extended European Search Report, dated Aug. 5, 2015, regarding Application No. 15157847.3, 7 pages.

* cited by examiner

COMPONENT DEPLOYMENT SYSTEM

RELATED PROVISIONAL APPLICATION

This application claims the benefit of U.S. Patent Application Ser. No. 61/799,231, entitled "Solar Arrays and Deployment Mechanisms for Solar Arrays," filed Mar. 15, 2013, which is incorporated herein by reference in its entirety.

BACKGROUND INFORMATION

1. Field

The present disclosure relates generally to deploying components and, in particular, to systems for deploying components. Still more particularly, the present disclosure relates to a method and apparatus for deploying components from a spacecraft.

2. Background

Spacecraft are used for various purposes while in space. A spacecraft, as used herein, is a vehicle, vessel, or machine configured to perform a number of operations in space. Spacecraft may be self-propelled space vehicles configured for short-term space missions, or space vehicles that are configured to remain in space for a longer period of time. In other cases, a spacecraft may be a space station, a satellite, or some other suitable structure.

Satellites are an increasingly popular type of spacecraft used to perform a variety of operations while in space. These satellites are used in a number of diverse fields. For example, without limitation, satellites may be used for navigation, communications, environmental monitoring, weather forecasting, research, broadcasting, and other applications. Many homes, businesses, government organizations, and other users may use satellites on a daily basis for entertainment, communications, information gathering, and other purposes.

Satellites are typically placed into orbit using launch vehicles and may be launched from moveable platforms or from land. The size of the satellite determines the amount of thrust needed from the launch vehicle to launch the satellite. In an effort to decrease the cost of placing a satellite into orbit, operators are decreasing the size of the satellite. As the size of the satellite decreases, the amount of thrust needed to launch the satellite also decreases. Both the decrease in size of the satellite, as well as the type of launch vehicle used, decreases the cost of launching the satellite into orbit. As a result, more and more entities are decreasing the size of satellites used.

Depending on the purpose of the satellite, components may be deployed from the satellite during various stages of operation. These components make take the form of panels. For example, at least one of a steering device, a drag device, an antenna, a solar panel, or some other type of component may be deployed from the satellite.

In some cases, solar panels are used by the satellite to generate energy from the sun. In this illustrative example, a solar panel is a group of photovoltaic modules electrically connected to a support structure. These solar panels may be stored close to the housing of the satellite during launch and later deployed while the satellite is in orbit. For instance, solar panels stored against the side of the satellite may unfold. In a similar fashion, other components, such as antennas, are stored close to the housing of the satellite during transport from the earth into orbit and later deployed.

With smaller satellites, the storage capacity of the satellite may not be as great as desired. For example, the satellite may need more power to perform operations than can be generated by the solar panels stored in, and deployed from, the satellite. In other instances, the size of the antenna that may be deployed from the satellite might not provide the amount of communications capability needed. As a result, the satellite may not function as desired. Therefore, it would be desirable to have a method and apparatus that take into account at least some of the issues discussed above, as well as other possible issues.

SUMMARY

In one illustrative embodiment, an apparatus comprises a group of panels, a group of flexible members connected to the group of panels, and an interface system associated with the group of panels and the group of flexible members. The group of panels is in a folded configuration against a number of sides of a spacecraft. The interface system is configured to move the group of panels from the folded configuration to a deployed configuration when the group of flexible members is extended from the spacecraft.

In another illustrative embodiment, a method for deploying a group of panels is presented. A group of flexible members is extended from a spacecraft. The group of panels is moved from a folded configuration to a deployed configuration using an interface system such that the group of flexible members is extended from the spacecraft.

In yet another illustrative embodiment, an antenna system comprises a group of flexible rods, an interface system, and a deployment mechanism. The group of flexible rods is associated with a group of antenna reflector panels in a folded configuration against a number of sides of a satellite. The interface system is associated with the group of antenna reflector panels and the group of flexible rods. The interface system is configured to move the group of antenna reflector panels from the folded configuration to a deployed configuration. The deployment mechanism is configured to extend the group of flexible rods as the group of antenna reflector panels moves from the folded configuration to the deployed configuration. In another illustrative embodiment, a steering system comprises a platform and a movement system. The platform is located within a housing of a satellite. The movement system is associated with the platform and configured to change an orientation of the platform to maneuver a group of components in space after the group of components is deployed from the satellite.

In still another illustrative embodiment, an antenna system comprises a parabolic antenna reflector, a group of flexible rods, an interface system, and a deployment mechanism. The parabolic antenna reflector is in a folded configuration against a number of sides of a satellite. The group of flexible rods is associated with the parabolic antenna reflector. The interface system is associated with the parabolic antenna reflector and the group of flexible rods. The interface system is configured to move the parabolic antenna reflector from the folded configuration to a deployed configuration. The deployment mechanism is configured to extend the group of flexible rods as the parabolic antenna reflector moves from the folded configuration to the deployed configuration.

In yet another illustrative embodiment, a solar panel comprises a solar array. The solar array has a first set of solar modules and a second set of solar modules. The first set of solar modules is configured to be folded along a longitudinal axis and the second set of solar modules is configured to be folded along a diagonal axis to form a folded configuration for the solar array.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a desired mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that it may be desirable to increase the size of components that are deployed from a satellite. For example, the illustrative embodiments recognize and take into account that with larger solar panels deployed from the satellite, more power can be generated by the satellite. This increase in power may provide additional operating capabilities for the satellite, increase the functioning life of the satellite, or both. In a similar fashion, the illustrative embodiments recognize and take into account that increasing the size of an antenna deployed from a satellite increases the communication capabilities of that satellite.

The illustrative embodiments recognize and take into account, however, that some currently used deployment systems for deploying components from a satellite include structures that may increase the weight of the satellite more than desired, require more storage space in the satellite than desired, or both. For example, some currently used systems include panels stored against the sides of the satellite. These panels are deployed away from the spacecraft after the satellite is in orbit. Cantilevered systems for unfolding panels may not hold the panels as stiff or as flat as desired, and may add more weight than desired to the satellite. Increasing the weight of the satellite is undesirable because the cost to launch the satellite increases as the weight of the satellite increases. Additionally, the size of the panels properly stored against the side of the satellite may be limited by the size of the satellite.

The illustrative embodiments further recognize and take into account that some currently used deployment systems for deploying components from a satellite may not perform as desired. For instance, when solar panels are being deployed, some deployment systems may not deploy the solar panels such that the solar panels lay flat. As a result, the solar panels may not capture the desired amount of light energy from the sun.

Thus, the illustrative embodiments provide a method and apparatus for deploying a group of panels. In one illustrative embodiment, an apparatus comprises a group of panels in a folded configuration against a number of sides of a spacecraft, a group of flexible members connected to the group of panels, and an interface system associated with the group of panels and the group of flexible members. The interface system is configured to move the group of panels from the folded configuration to a deployed configuration when the group of flexible members is extended from the spacecraft.

Figure 1:
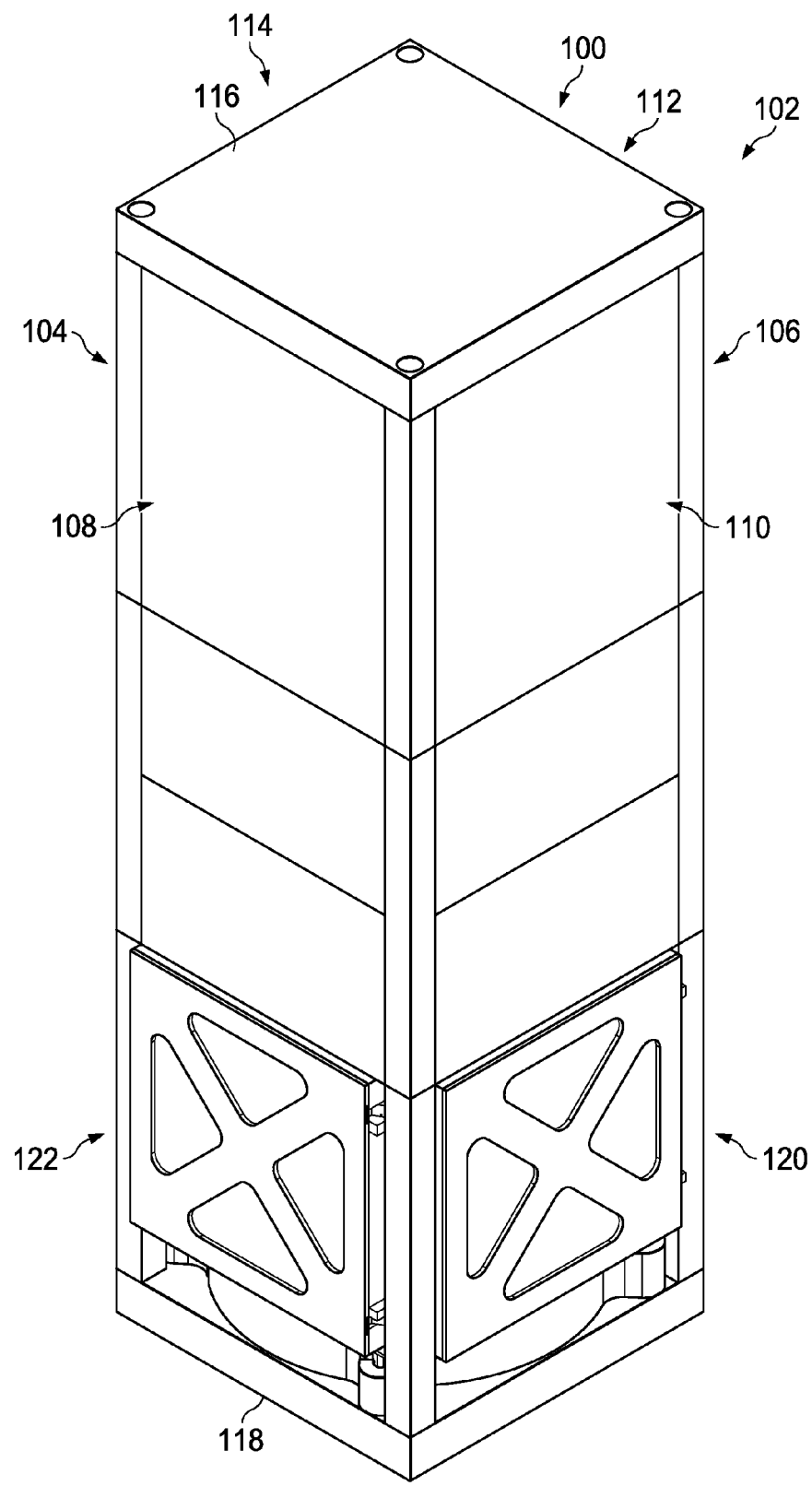
FIG. 1 is an illustration of a spacecraft in accordance with an illustrative embodiment.

Referring now to the figures and, in particular, with reference to FIG. 1, an illustration of a spacecraft is depicted in accordance with an illustrative embodiment. Spacecraft 100 takes the form of satellite 102.

As depicted, satellite 102 includes housing 104 with number of sides 106. Number of sides 106 includes side 108, side 110, side 112, and side 114. Satellite 102 also includes top plate 116 and bottom plate 118.

Satellite 102 comprises deployment system 120 in this illustrative example. Deployment system 120 is associated with housing 104 of satellite 102. In this illustrative example, deployment system 120 is located within base section 122 of housing 104. Deployment system 120 is configured to deploy a group of components (not shown in this view) from satellite 102.

Figure 2:
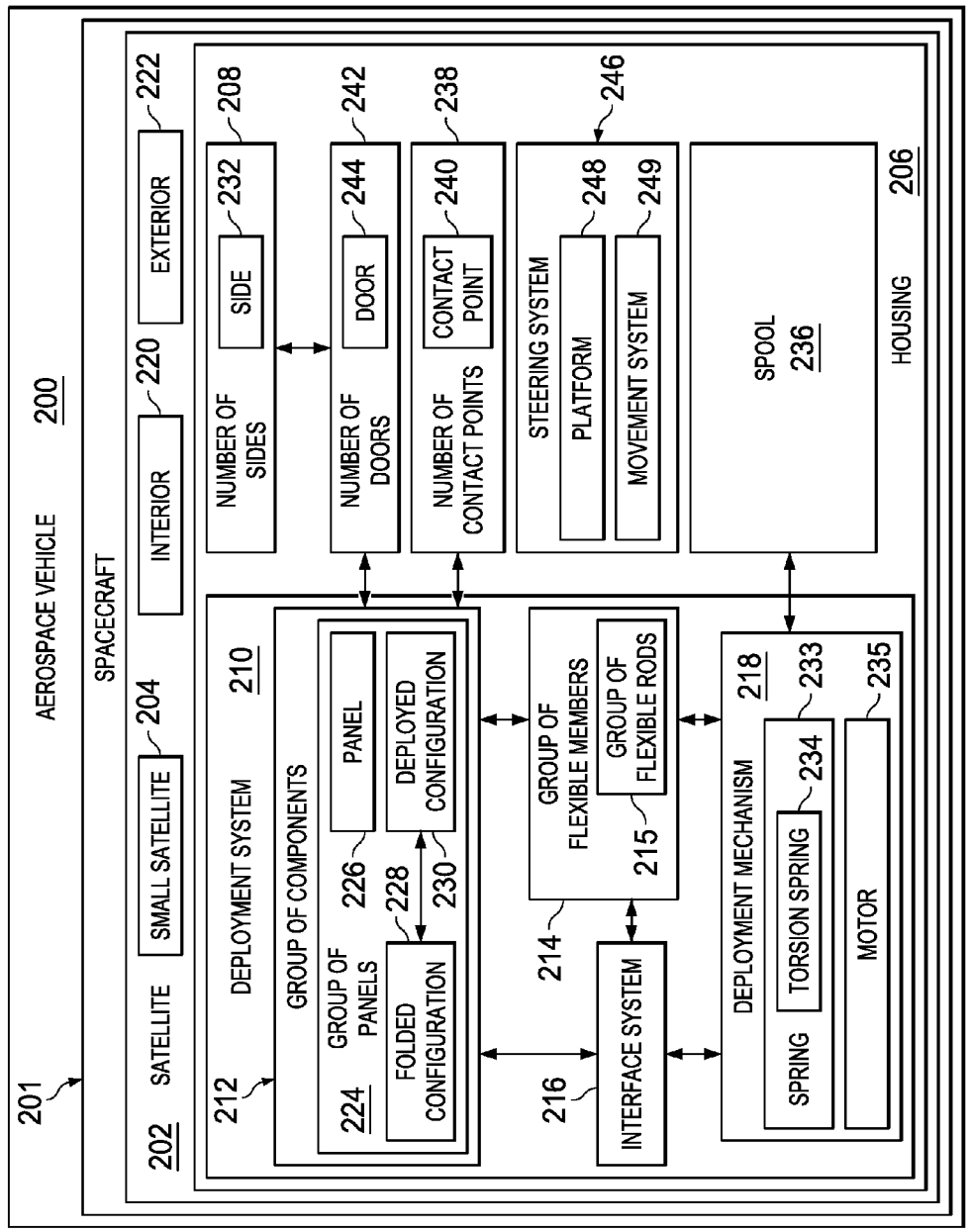
FIG. 2 is an illustration of a block diagram of an aerospace vehicle in accordance with an illustrative embodiment.

With reference next to FIG. 2, an illustration of a block diagram of an aerospace vehicle is depicted in accordance with an illustrative embodiment. In this depicted example, aerospace vehicle 200 is a vehicle that may be capable of flight within the Earth's atmosphere, outside the Earth's atmosphere, or both. For example, aerospace vehicle 200 may be selected from one of an aircraft, a spacecraft, or some other suitable type of aerospace vehicle.

As depicted, aerospace vehicle 200 takes the form of spacecraft 201. In this depicted example, spacecraft 100 from FIG. 1 is an example of a physical implementation for spacecraft 201 shown in block form in this figure. Spacecraft 201 is satellite 202 in this illustrative example.

Satellite 202 is an object that has been placed into orbit. Satellite 202 is an artificial satellite in this illustrative example. In other words, satellite 202 is a man-made satellite.

In this depicted example, satellite 202 may take various forms. For instance, satellite 202 may take the form of at least one of an astronomy satellite, a research satellite, a communications satellite, a navigation satellite, a reconnaissance satellite, a weather satellite, or other suitable types of satellites.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Satellite 202 is small satellite 204 in this illustrative example. Small satellite 204 is a satellite with a weight from about 1 gram to about 500 kilograms. In other illustrative examples, satellite 202 may be smaller or larger, depending on the particular implementation. Small satellite 204 may be selected from one of a miniature satellite, a micro-satellite, a nano-satellite, a cube satellite, and other suitable types of small satellites.

In this depicted example, satellite 202 includes housing 206 with number of sides 208. As used herein, a "number of" items is one or more items. For example, number of sides 208 is one or more sides.

As depicted, housing 206 forms the structure of satellite 202 which provides mechanical support for satellite 202. In this illustrative example, housing 206 is comprised of a material selected from one of a metal, a metal alloy, a composite material, other suitable types of materials, or combinations of materials.

As illustrated, deployment system 210 is physically associated with housing 206 of satellite 202. A first component, such as deployment system 210, may be considered to be physically associated with a second component, such as housing 206 of satellite 202, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, as an extension of the second component, or a combination thereof.

In this depicted example, deployment system 210 is located within housing 206 of satellite 202. Deployment system 210 comprises group of components 212, group of flexible members 214, interface system 216, and deployment mechanism 218. As used herein, a "group of" items is one or more items. For instance, group of components 212 is one or more components. Components within group of components 212 may include the same or different types of components.

In this illustrative example, deployment system 210 is configured to deploy group of components 212 from satellite 202. For example, deployment system 210 is configured to move group of components 212 from interior 220 of satellite 202 to exterior 222 of satellite 202.

In other illustrative examples, deployment system 210 moves group of components 212 stored at exterior 222 of satellite 202 into a desired position. For instance, deployment system 210 may unfold group of components 212.

In this depicted example, group of components 212 includes group of panels 224. Group of panels 224 are structures configured to take a desired form when deployed from satellite 202. In an illustrative example, group of panels 224 may take the form of flat, rectangular structures when deployed from satellite 202.

As depicted, group of panels 224 comprises panel 226. Panel 226 may take a number of different forms. For example, panel 226 in group of panels 224 may be selected from one of a solar panel, an antenna, a drag device, and other suitable types of panels.

Deployment system 210 is configured to move group of panels 224 between folded configuration 228 and deployed configuration 230 in this illustrative example. Folded configuration 228 is an arrangement for group of panels 224 in which each of group of panels 224 is bent over on itself so that at least a portion of each of group of panels 224 covers another portion of each of group of panels 224. In folded configuration 228, each of group of panels 224 may be folded a number of times to fit within housing 206 of satellite 202.

Deployed configuration 230 is an arrangement in which group of panels 224 are extended. In this illustrative example, deployed configuration 230 is an unfolded arrangement for group of panels 224.

Group of panels 224 in folded configuration 228 are associated with number of sides 208 of satellite 202. For example, panel 226 in group of panels 224 is folded against side 232 in number of sides 208 of housing 206 of satellite 202.

In this depicted example, group of flexible members 214 are connected to group of panels 224. Group of flexible members 214 are configured to extend group of panels 224 from satellite 202.

Group of flexible members 214 may take various forms in this illustrative example. For instance, group of flexible members 214 may take the form of a rod, a cable, a cord, a rope, a ribbon, a wire, a beam, a line, or some other suitable type of flexible member.

Group of flexible members 214 may be comprised of structures with different types of cross-sectional shapes. For instance, group of flexible members 214 may be comprised of structures with a cross-sectional shape selected from at least one of a round shape, a triangular shape, a rectangular shape, an irregular shape, a hexagonal shape, or some other suitable type of cross-sectional shape. Group of flexible members 214 may have the same or different cross-sectional shape from one another.

In this illustrative example, group of flexible members 214 also may be comprised of a number of different types of materials. For example, group of flexible members 214 may be comprised of a material selected from at least one of a composite material, carbon fiber, a metal, a metal alloy, fiberglass, a polymer, or some other suitable material. The material selected for group of flexible members 214 is one that allows group of flexible members 214 to bend in a desired manner without breaking, while still supporting group of panels 224 and interface system 216. Group of flexible members 214 may take the form of group of flexible rods 215 in this illustrative example.

As illustrated, interface system 216 is physically associated with group of panels 224 and group of flexible members 214. Interface system 216 is configured to move group of panels 224 from folded configuration 228 to deployed configuration 230 when group of flexible members 214 are extended from satellite 202. For instance, interface system 216 holds group of panels 224 substantially flat when group of panels 224 is in deployed configuration 230.

In this illustrative example, deployment mechanism 218 is associated with housing 206 of satellite 202. For instance, deployment mechanism 218 may be located within housing 206 of satellite 202. Deployment mechanism 218 is a mechanical device configured to extend group of flexible members 214 from interior 220 of satellite 202 to exterior 222 of satellite 202 such that group of panels 224 move from folded configuration 228 to deployed configuration 230.

As depicted, deployment mechanism 218 takes various forms. For example, deployment mechanism 218 may take the form of spring 233, motor 235, and other suitable types of deployment mechanisms.

When deployment mechanism 218 takes the form of spring 233, spring 233 may be selected from one of a tension spring, a compression spring, a torsion spring, a mainspring, a ribbon spring, a flat spring, a coil spring, and other suitable types of springs. When deployment mechanism 218 takes the form of motor 235, group of flexible members 214 may be deployed from satellite 202 in a controlled manner. In other words, based on the speed of motor 235, the deployment of group of flexible members 214 may be controlled. The speed of motor 235 may be predetermined or adjusted during deployment of group of flexible members 214.

In other illustrative examples, deployment mechanism 218 may include multiple types of devices in addition to or in place of spring 233 and motor 235. In this illustrative example, deployment mechanism 218 takes the form of torsion spring 234. Torsion spring 234 is a flexible, elastic device that stores mechanical energy when coiled.

Torsion spring 234 is configured to be coiled around spool 236 located within housing 206 of satellite 202 in this illustrative example. Group of flexible members 214 is also configured to be wound on spool 236. Once released, torsion spring 234 unwinds from spool 236 to extend group of flexible members 214. In this manner, group of panels 224 is deployed using group of flexible members 214 and torsion spring 234. Alternatively, when motor 235 is used in deployment mechanism 218, motor 235 turns spool 236 to extend group of flexible members 214.

In this depicted example, group of panels 224 is connected to housing 206 of satellite 202 at number of contact points 238 along housing 206. Number of contact points 238 is positioned on number of sides 208 of housing 206 of satellite 202. For instance, panel 226 may be connected to side 232 of housing 206 at contact point 240.

Each of group of panels 224 may be connected to housing 206 at number of contact points 238 in several ways. For example, each of group of panels 224 may be connected to housing 206 at number of contact points 238 using an adhesive. In another illustrative example, each of group of panels 224 may be connected to housing 206 at number of contact points 238 using fasteners. These fasteners may be selected from one of clips, pins, screws, ties, or other suitable types of fasteners.

As illustrated, group of panels 224 are located against number of sides 208 of housing 206 of satellite 202 when group of panels 224 is in folded configuration 228. Number of doors 242 is associated with group of panels 224 located against number of sides 208 of housing 206.

In this illustrative example, number of doors 242 are configured to cover group of panels 224 located against number of sides 208 of housing 206 in folded configuration 228 and open such that group of panels 224 move from folded configuration 228 to deployed configuration 230. For example, door 244 in number of doors 242 is configured to open to move panel 226 located against side 232 of housing 206 from folded configuration 228 to deployed configuration 230.

As depicted, housing 206 of satellite 202 also includes steering system 246. Steering system 246 is configured to maneuver group of components 212 in space after group of components 212 have been deployed using deployment system 210. For instance, steering system 246 moves group of panels 224 such that group of panels 224 face at least one of the sun, an intended target, or some other suitable structure in space. Steering system 246 moves group of panels 224 while the body of satellite 202 moves toward the structure, away from the structure, toward another object of interest, or some combination thereof.

In another illustrative example, steering system 246 moves group of panels 224 in a desired manner such that mission objectives can be achieved. For instance, steering system 246 may tilt group of panels 224 such that group of panels 224 receive a desired amount of electromagnetic signals.

In this illustrative example, steering system 246 comprises platform 248 and movement system 249. In other illustrative examples, steering system 246 includes other components and combinations of components. The components within steering system 246 are configured to change the orientation of platform 248. In particular, the components within steering system 246 are configured to change the normal vector of the plane of deployed platform 248 such that group of panels 224 can point at any number of areas of interest.

As depicted, platform 248 is located within housing 206 of satellite 202. In some illustrative examples, platform 248 is located in the space between group of panels 224 in satellite 202. In this case, platform 248 is attached to group of panels 224 such that the movement of platform 248 changes the configuration of group of panels 224.

In this depicted example, movement system 249 is configured to tilt the normal vector of platform 248 to its desired location. Movement system 249 may include, for example, without limitation, at least one motor with a rack and pinion device, or some other suitable type of movement system.

In some illustrative examples, steering system 246 includes at least one pivot point about which the platform 248 is tilted using movement system 249. In still other examples, steering system 246 may include springs, in addition to movement system 249, that are configured to extend when movement system 249 retracts and compress when movement system 249 extends. In this case, the springs are present to balance the actions of movement system 249, reduce the torque needed from movement system 249, or both. As a result, the size of movement system 249 may be reduced.

With the use of deployment system 210 for satellite 202, group of panels 224 may be deployed from satellite 202 in a desired manner. As a result, larger panels may be stored behind number of doors 242 in folded configuration 228 than some currently used systems. Group of flexible members 214 and interface system 216 allow group of panels 224 to be extended in a desired manner such that each of group of panels 224 unfolds.

Figure 3:
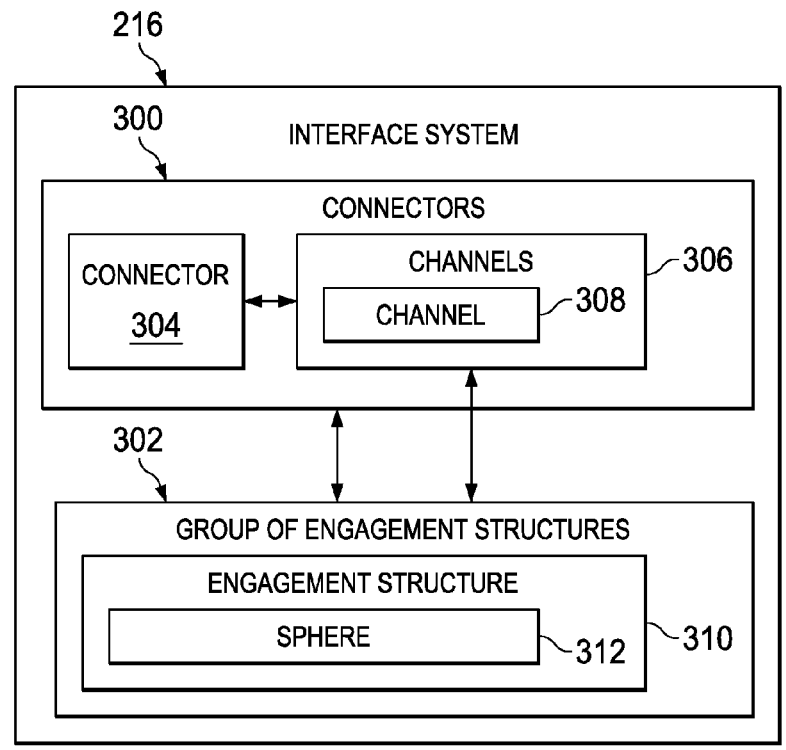
FIG. 3 is an illustration of a block diagram of an interface system in accordance with an illustrative embodiment.

With reference next to FIG. 3, an illustration of a block diagram of an interface system is depicted in accordance with an illustrative embodiment. In this depicted example, the components within interface system 216 from FIG. 2 are shown.

As depicted, interface system 216 includes connectors 300 and group of engagement structures 302. Connectors 300 are associated with group of panels 224 and group of flexible members 214 from FIG. 2. In this illustrative example, connectors 300 are configured to attach to group of panels 224. For example, connector 304 in connectors 300 is configured to attach to panel 226 from FIG. 2 in group of panels 224.

Each one of connectors 300 attaches to one of group of panels 224 at different points on the panel in this illustrative example. For example, when three of connectors 300 are connected to panel 226, and panel 226 is a rectangular structure, each of those connectors are attached to a corner of panel 226. In this manner, one corner of panel 226 is attached mechanically and electrically to housing 206 of satellite 202 at contact point 240 from FIG. 2, while three of connectors 300 are each attached to panel 226 at one of the other three corners of panel 226.

Connectors 300 are configured to move as panel 226 is deployed from satellite 202 in this illustrative example. For example, connectors 300 move as panel 226 is moved from folded configuration 228 to deployed configuration 230.

In this depicted example, connectors 300 comprise channels 306. Each of connectors 300 has one of channels 306. For instance, connector 304 comprises channel 308. Channels 306 are configured to receive group of engagement structures 302.

Channels 306 may be the same or different size channels in this illustrative example. As an example, one of channels 306 may be larger than another one of channels 306. When three or more channels 306 are present, each channel may be a different size.

In this depicted example, group of engagement structures 302 are associated with group of flexible members 214. For example, group of engagement structures 302 may be attached to group of flexible members 214 at various points along group of flexible members 214. Each of group of engagement structures 302 is a different size in this illustrative example.

Channels 306 correspond to group of engagement structures 302. Specifically, one of channels 306 corresponds with one of group of engagement structures 302. For instance, channel 308 in connector 304 corresponds to engagement structure 310 in group of engagement structures 302.

Engagement structure 310 in group of engagement structures 302 is configured to engage with connector 304 in connectors 300 to move panel 226 in group of panels 224 from folded configuration 228 to deployed configuration 230. In this case, channel 308 is shaped such that engagement structure 310 may be received by channel 308 in a desired manner. As engagement structure 310 is received by channel 308, these two components help to maintain deployed configuration 230 of panel 226.

In this illustrative example, engagement structure 310 takes the form of sphere 312. Sphere 312 engages with channel 308 in connector 304. Channel 308 is shaped such that sphere 312 is received by channel 308. For instance, channel 308 may have a shape of a cone.

Group of flexible members 214 are run through channels 306 of connectors 300. In this manner, as group of panels 224 are extended, each of group of engagement structures 302 engages with a corresponding one of connectors 300, depending on the size and shape of each of channels 306 in connectors 300. As a result, the engagement of group of engagement structures 302 with channels 306 in connectors 300 moves each of group of panels 224 from folded configuration 228 to deployed configuration 230.

Figure 4:
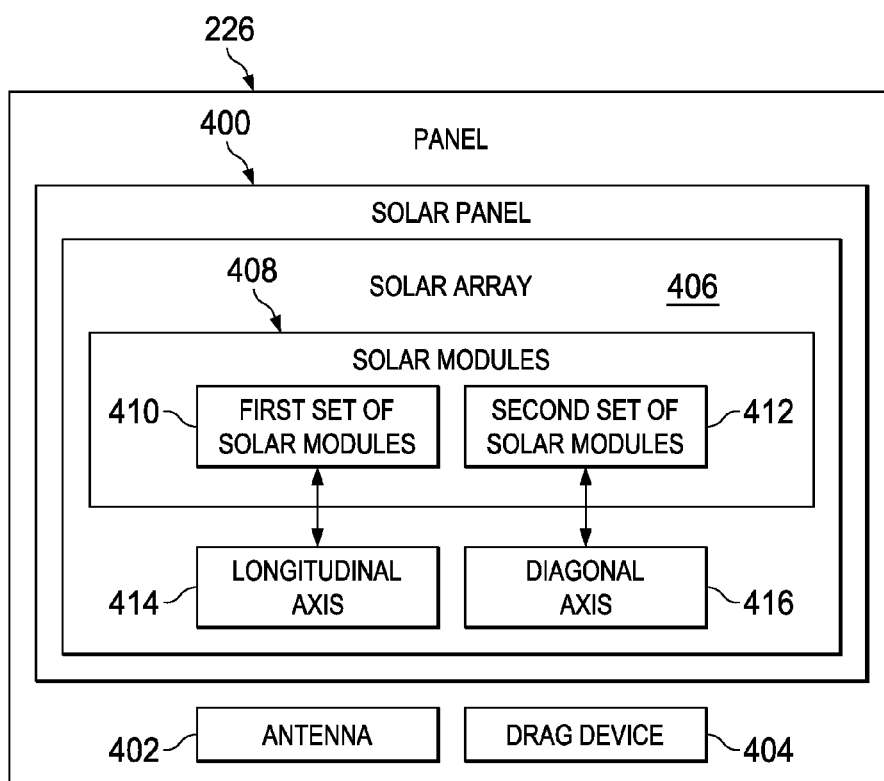
FIG. 4 is an illustration of a block diagram of a panel in accordance with an illustrative embodiment.

Turning next to FIG. 4, an illustration of a block diagram of a panel is depicted in accordance with an illustrative embodiment. In this depicted example, components that may form panel 226 from FIG. 2 are shown.

As depicted, panel 226 may be selected from one of solar panel 400, antenna 402, and drag device 404. In other illustrative examples, other types of panels may be used for panel 226, depending on the particular implementation.

In this depicted example, solar panel 400 is configured to supply electric power to satellite 202 in FIG. 2. Solar panel 400 generates electric power from the sun.

Solar panel 400 includes solar array 406. Solar array 406 is an arrangement of solar modules 408 in this illustrative example. Solar modules 408 comprise cells configured to convert solar radiation into direct current energy. Solar array 406 includes first set of solar modules 410 and second set of solar modules 412. Solar panel 400 with solar array 406 is configured to be folded into a folded configuration and stored behind number of doors 242 in FIG. 2.

In this illustrative example, first set of solar modules 410 is configured to be folded along longitudinal axis 414 of solar array 406. Second set of solar modules 412 is configured to be folded along diagonal axis 416 of solar array 406. First set of solar modules 410 and second set of solar modules 412 form a folded configuration for solar array 406.

As illustrated, antenna 402 is a device that sends and receives signals for satellite 202. Antenna 402 may take the form of a parabolic antenna in some illustrative examples. A "parabolic antenna" is an antenna with a curved surface with a cross-sectional shape of a parabola configured to direct radio waves. In other illustrative examples, antenna 402 is a flat, rectangular structure, similar to solar panel 400.

Antenna 402 may be located against side 232 of housing 206 of satellite 202 from FIG. 2 during launch and later deployed to perform communications operations for satellite 202. These communications operations may take the form of telephone communication, television communication, radio communication, Internet operations, military communication, and other types of communications operations utilizing various frequencies from the electromagnetic spectrum.

In this depicted example, drag device 404 is a structure used to slow the motion of satellite 202. Drag device 404 may be deployed during various stages of operation of satellite 202 to create drag.

The illustration of aerospace vehicle 200 in FIG. 2 and the components within aerospace vehicle 200 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although the illustrative examples for an illustrative embodiment are described with respect to a spacecraft, the illustrative embodiment may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, an aircraft, a submarine, an automobile, a power plant, a bridge, a dam, a house, a windmill, a manufacturing facility, a building, and other suitable platforms.

In some illustrative examples, aerospace vehicle 200 takes the form of an aircraft. In an illustrative example, aerospace vehicle 200 takes the form of an unmanned aerial vehicle. In this case, deployment system 210 may be used to deploy group of components 212 from the unmanned aerial vehicle. For instance, a drag device may be deployed from the unmanned aerial vehicle to create drag to slow the unmanned aerial vehicle.

In other illustrative examples, satellite 202 is another type of satellite other than small satellite 204. In still other illustrative examples, steering system 246 is absent from satellite 202.

In yet another illustrative example, solar modules 408 in solar array 406 in FIG. 4 comprise only one set of solar modules of the same type. In this case, all of solar modules 408 may be configured to be folded along either longitudinal axis 414 or diagonal axis 416 of solar array 406.

In another illustrative example, panel 226 may comprise two or more types of arrays. For instance, half of panel 226 may be a solar panel, while the other half of panel 226 may be an antenna. In this instance, panel 226 provides various functions for satellite 202. In still another illustrative example, group of panels 224 may be deployed at different times from one another.

Although panel 226 in group of panels 224 has been described as a flat, rectangular structure in one example, panel 226 may take other forms. For instance, panel 226 may comprise a parabolic structure, a circular structure, a sphere, a triangular structure, a hexagonal structure, or some other suitable type of structure. When panel 226 is not a rectangular structure, more or fewer connectors and engagement structures may be used to deploy panel 226.

Figure 5:
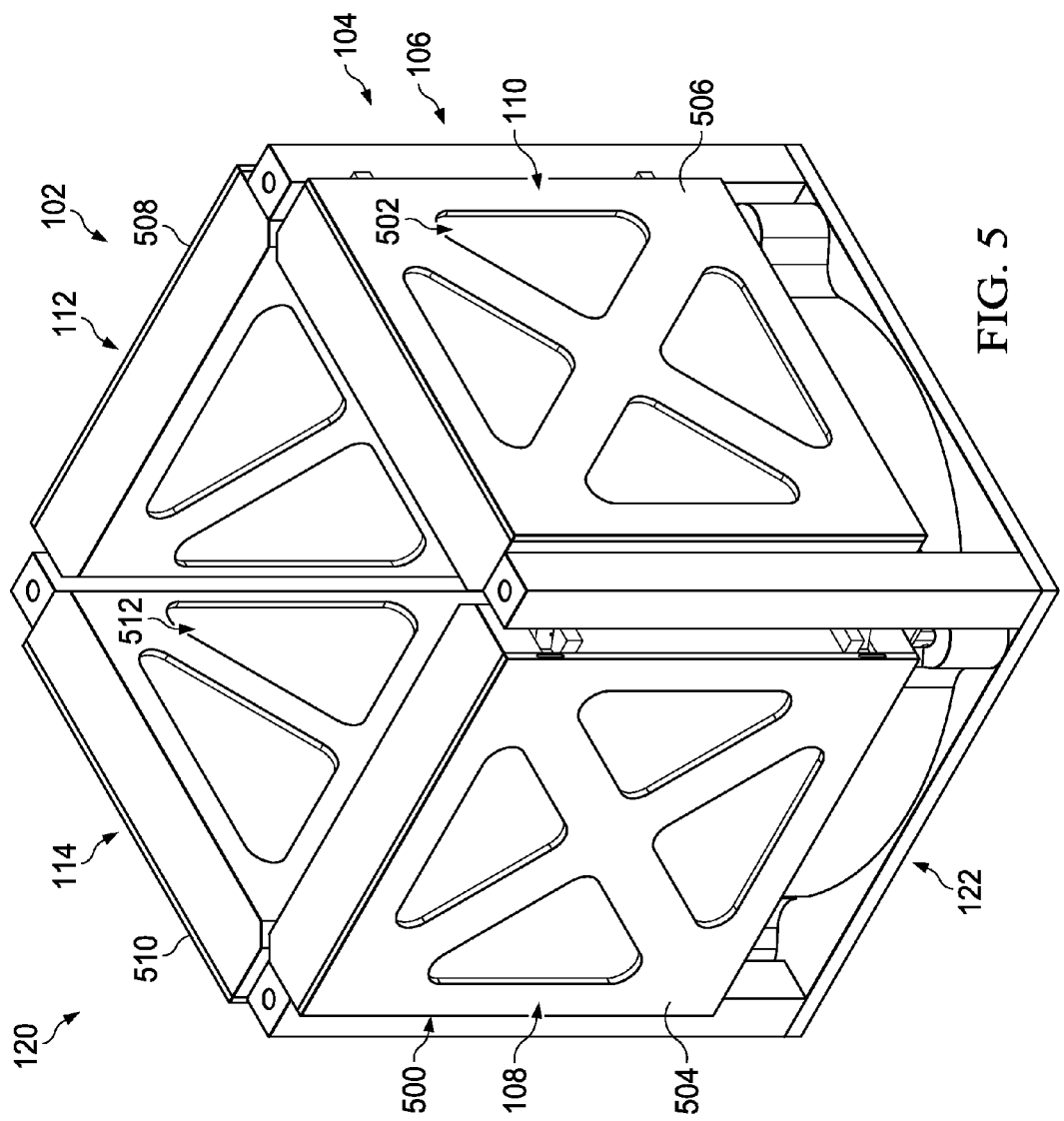
FIG. 5 is an illustration of a deployment system for a satellite in accordance with an illustrative embodiment.

Turning next to FIG. 5, an illustration of a deployment system for a satellite is depicted in accordance with an illustrative embodiment. In this depicted example, deployment system 120 from base section 122 from FIG. 1 is shown. Other components within satellite 102 have been removed in this illustration to show deployment system 120 in greater detail.

As illustrated, number of doors 500 is associated with number of sides 106 of housing 104 of satellite 102. Group of components 502 are stored behind number of doors 500 in this illustrative example. Number of doors 500 is configured to open to deploy group of components 502 from satellite 102.

In this depicted example, door 504, door 506, door 508, and door 510 are associated with side 108, side 110, side 112, and side 114 of housing 104 of satellite 102, respectively. At least one of door 504, door 506, door 508, and door 510 is configured to open to deploy group of components 502 from satellite 102.

For example, a command may be sent to a device within deployment system 120 to command the doors to open. This device may be a launch lock (not shown in this view). In one illustrative example, the launch lock includes an electrically commanded heat element near a polymer wire. Once activated, number of doors 500 open using, for example, without limitation, torsion springs. In other illustrative examples, the launch lock may include an electrically commanded tension wire fuse, or some other suitable component, depending on the particular implementation.

As illustrated, deployment system 120 is used to deploy group of components 502 from satellite 102 after number of doors 500 have opened. A portion of deployment system 120 may be exposed to the environment surrounding base section 122 of housing 104 of satellite 102 in some examples. Space 512 is present between group of components 502 in this illustrative example.

Figure 6:
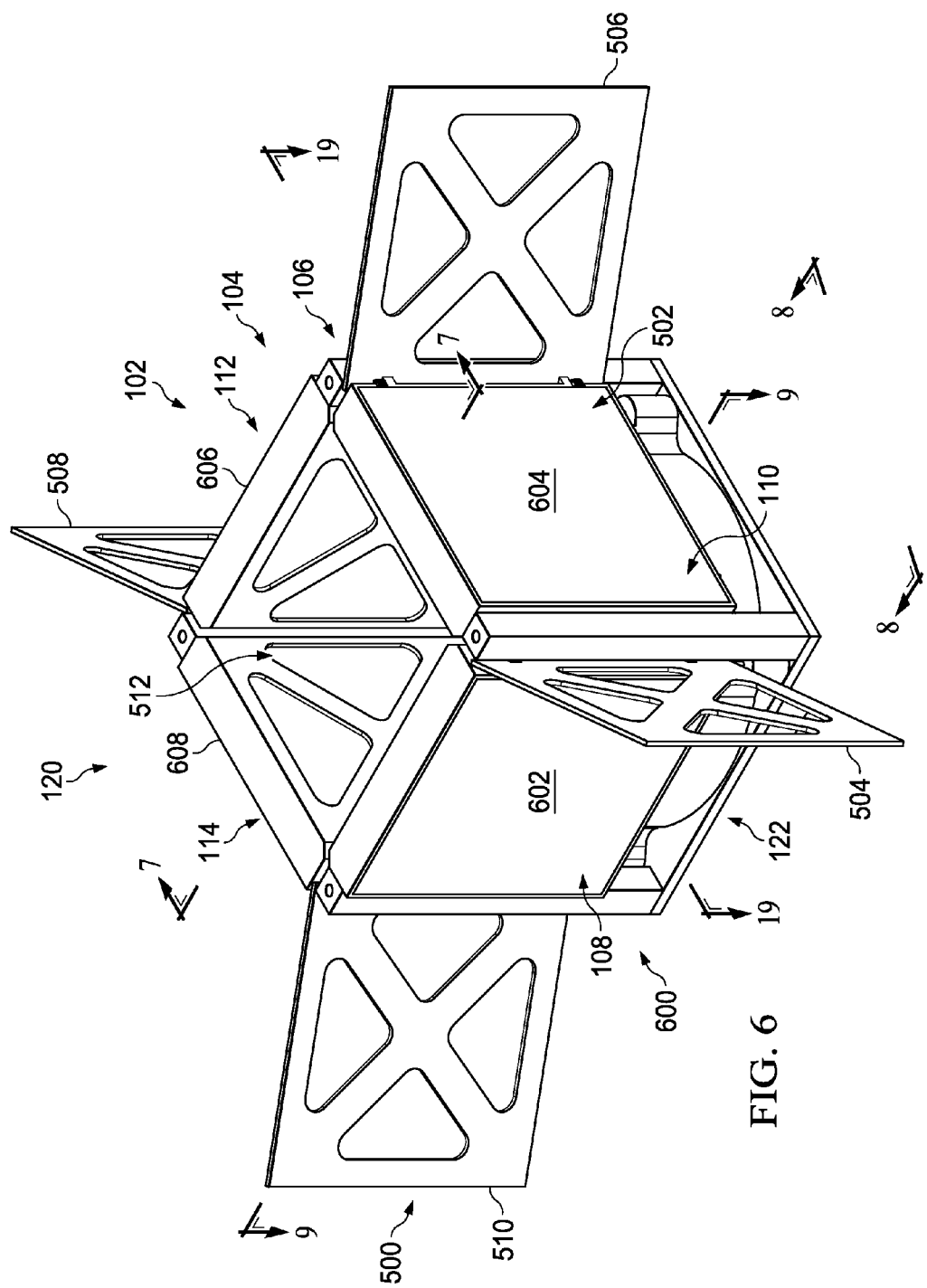
FIG. 6 is an illustration of a deployment system for a satellite in accordance with an illustrative embodiment.

Referring now to FIG. 6, an illustration of a deployment system for a satellite is depicted in accordance with an illustrative embodiment. In this depicted example, satellite 102 from FIG. 1 is shown with number of doors 500 in an open position to expose group of components 502 stored behind number of doors 500.

Group of components 502 comprise group of panels 600 in this illustrative example. Group of panels 600 are solar panels in this illustrative example. Door 504, door 506, door 508, and door 510 have opened to expose panel 602, panel 604, panel 606, and panel 608, respectively. Group of panels 600 may now be deployed from satellite 102 using deployment system 120.

Figure 7:
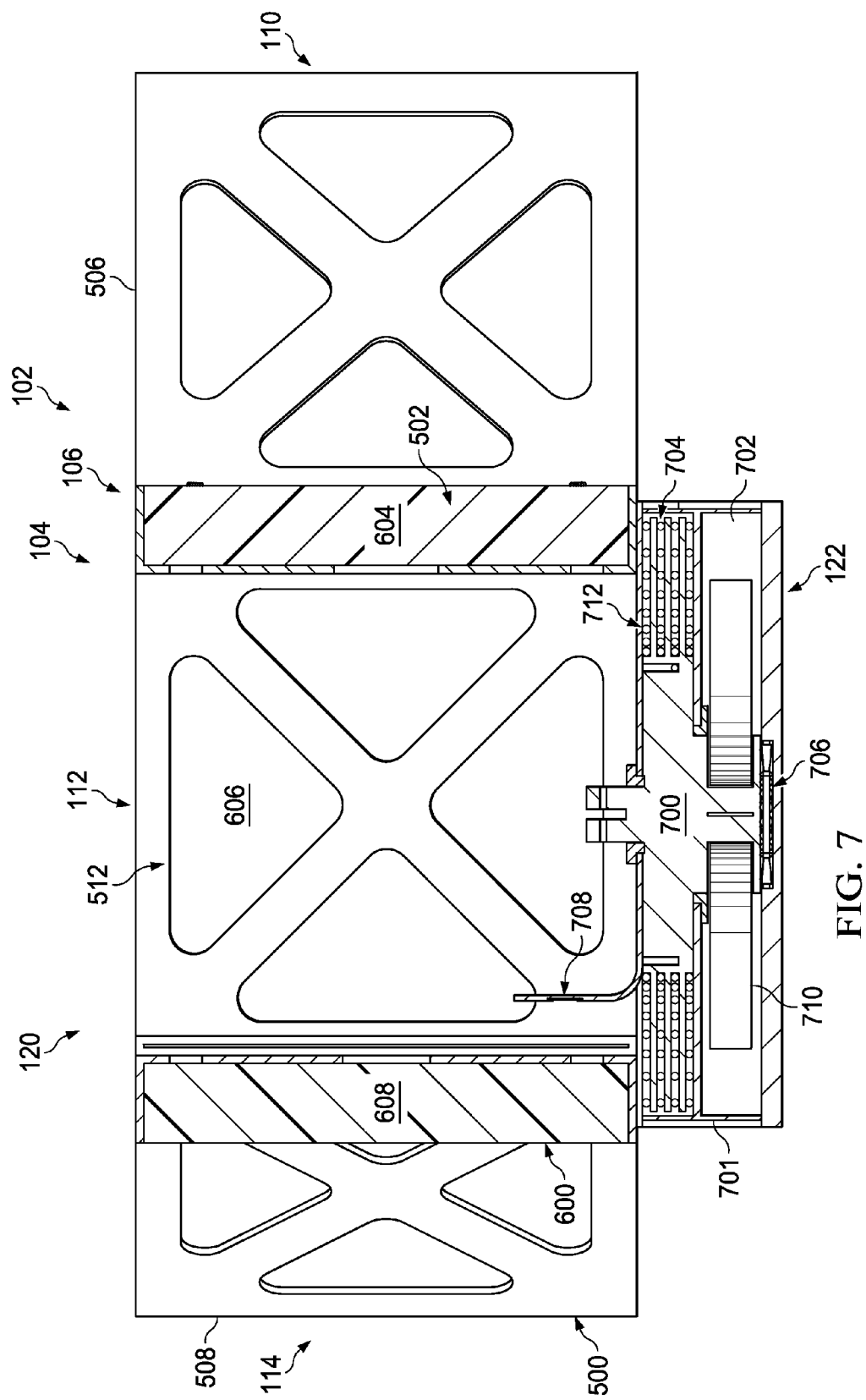
FIG. 7 is an illustration of a cross-sectional view of a deployment system for a satellite in accordance with an illustrative embodiment.

In FIG. 7, an illustration of a cross-sectional view of a deployment system for a satellite is depicted in accordance with an illustrative embodiment. In this depicted example, a cross-sectional view of deployment system 120 taken along the lines 7-7 in FIG. 6 is shown. Components within deployment system 120 in base section 122 of housing 104 of satellite 102 are shown in greater detail in this illustrative example.

As depicted, deployment system 120 includes spool 700, chamber 701, spring compartment 702, number of rod compartments 704, bearing 706, and launch lock 708. Spring 710 is wound around spool 700 and stored within spring compartment 702.

Chamber 701 of deployment system 120 houses spring compartment 702, number of rod compartments 704, spring 710, and group of flexible rods 712. Group of flexible rods 712 is an example of one implementation for a type of group of flexible members that may be deployed from satellite 102 in this illustrative example.

In this depicted example, group of flexible rods 712 are wound around spool 700 and stored in number of rod compartments 704. Each flexible rod in group of flexible rods 712 is stored in one of number of rod compartments 704 in this illustrative example.

When spring 710 stored in spring compartment 702 is released, spring 710 unwinds. Bearing 706 attached to spool 700 causes spool 700 to turn as spring 710 unwinds. This unwinding and the movement of spool 700 using bearing 706 causes group of flexible rods 712 to be pushed out of number of rod compartments 704. Number of rod compartments 704 guide each of group of flexible rods 712 to extend in a desired manner. Bearing 706 takes the form of a trust bearing in this illustrative example. Bearing 706 may take other forms configured to provide rotation of spool 700 in other illustrative examples.

As illustrated, launch lock 708 activates the unwinding of spring 710 from spool 700. Launch lock 708 also causes number of doors 500 to open using, for example, torsion springs at each door hinge.

Figure 8:
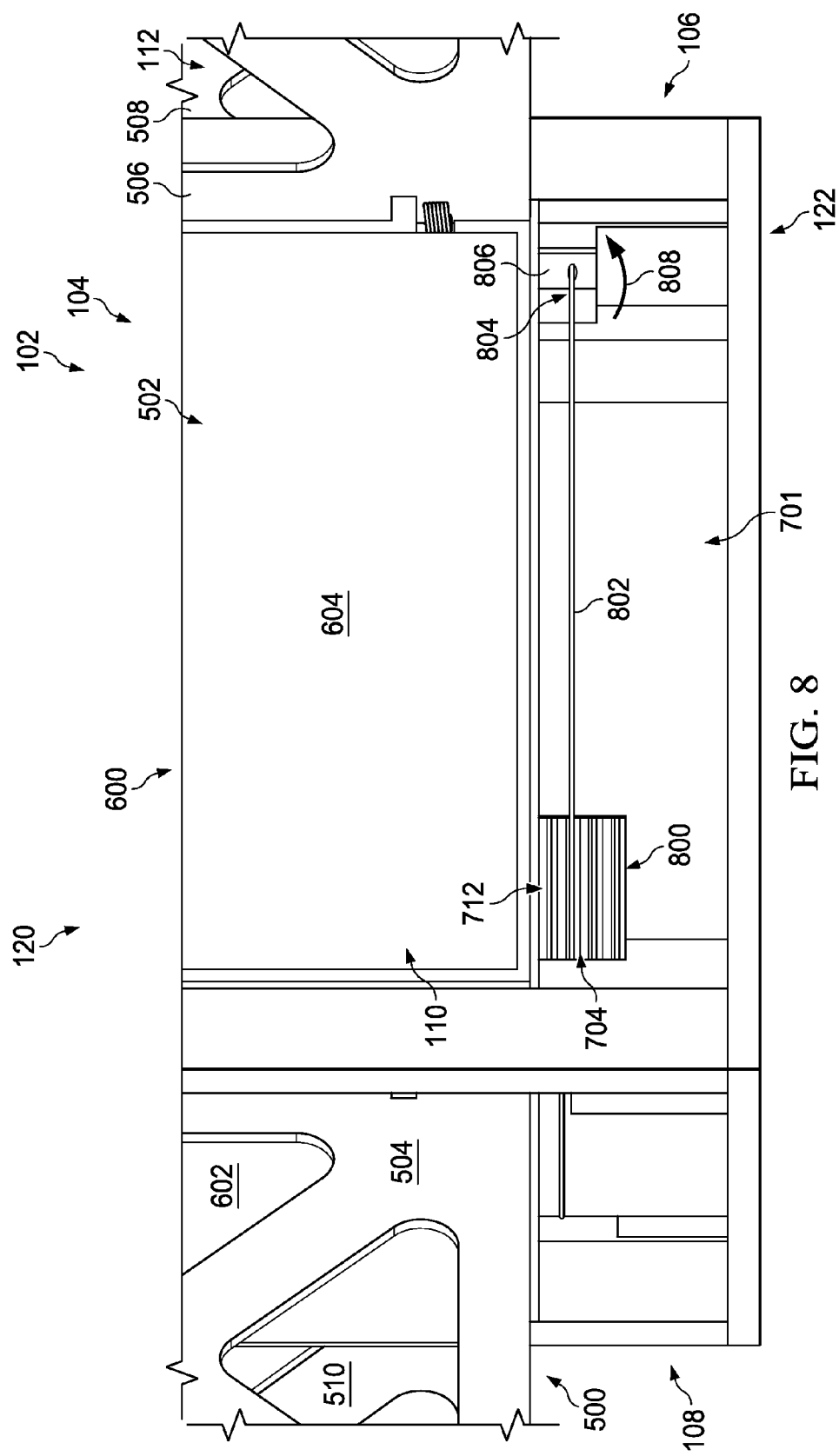
FIG. 8 is an illustration of a deployment system for a satellite in accordance with an illustrative embodiment.

Turning next to FIG. 8, an illustration of a deployment system for a satellite is depicted in accordance with an illustrative embodiment. In this depicted example, a view of deployment system 120 is shown in the direction of lines 8-8 in FIG. 6.

As illustrated, chamber 701 of deployment system 120 has opening 800. Group of flexible rods 712 in number of rod compartments 704 are seen through opening 800. Flexible rod 802 is extended from opening 800 in deployment system 120 as spring 710 unwinds from spool 700 shown in FIG. 7. Flexible rod 802 is configured to deploy panel 604 as flexible rod 802 is extended.

In this illustrative example, first end 804 of flexible rod 802 is attached to barrel nut 806. Barrel nut 806 is a type of nut that includes threads perpendicular to the length of the nut. A second end of flexible rod 802 (not shown) is attached to spool 700.

In some illustrative examples, barrel nut 806 is configured to pivot as flexible rod 802 is extended from chamber 701. For example, barrel nut 806 may pivot in the direction of arrow 808 as flexible rod 802 is extended from chamber 701. Each rod in group of flexible rods 712 extends in a similar manner from a different side of satellite 102.

Although first end 804 of flexible rod 802 is shown and described attached to barrel nut 806, first end 804 may be attached within deployment system 120 in some other manner. For instance, first end 804 of flexible rod 802 may be attached using a different type of part or combination of parts in addition to or in place of barrel nut 806.

Figure 9:
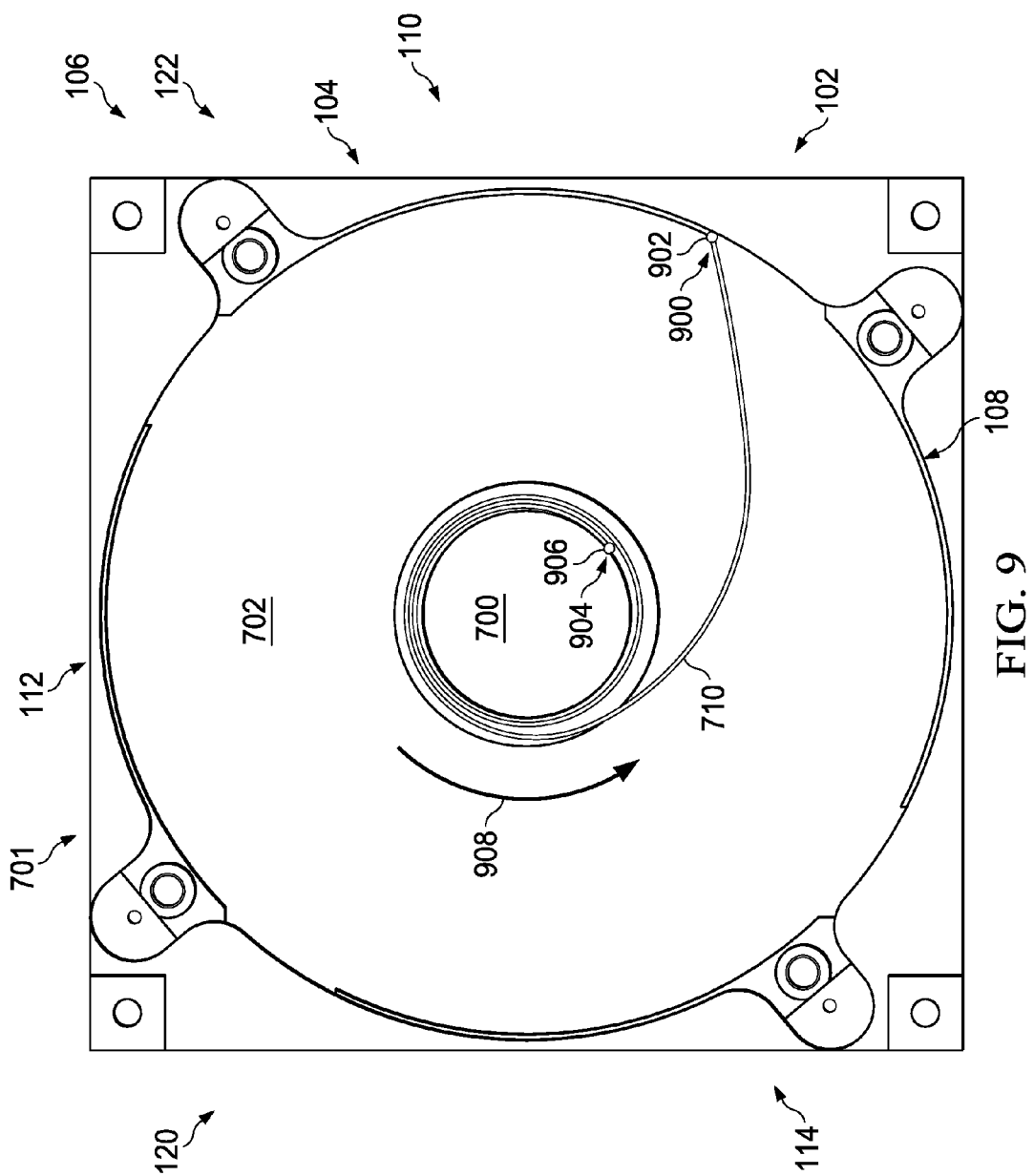
FIG. 9 is an illustration of a cross-sectional view of a deployment system for a satellite in accordance with an illustrative embodiment.

Referring now to FIG. 9, an illustration of a cross-sectional view of a deployment system for a satellite is depicted in accordance with an illustrative embodiment. In this depicted example, a cross-sectional view of deployment system 120 for satellite 102 taken along the lines 9-9 in FIG. 6 is shown.

As depicted, spring 710 is shown wound around spool 700. First end 900 of spring 710 is attached to a structure in chamber 701 of deployment system 120 at contact point 902. Second end 904 is associated with spool 700. Second end 904 of spring 710 is connected to spool 700 at contact point 906. Spring 710 unwinds in the direction of arrow 908 in this depicted example.

FIGS. 10-18 depict the deployment of a panel from a satellite using a deployment system. In particular, FIGS. 10-18 depict deployment system 120 as panel 604 is moved from a folded configuration to a deployed configuration from side 110 of satellite 102. Although FIGS. 10-18 show the movement of one panel 604, panel 602, panel 606, and panel 608 (not shown in these figures) are deployed from satellite 102 in a similar manner.

Figure 10:
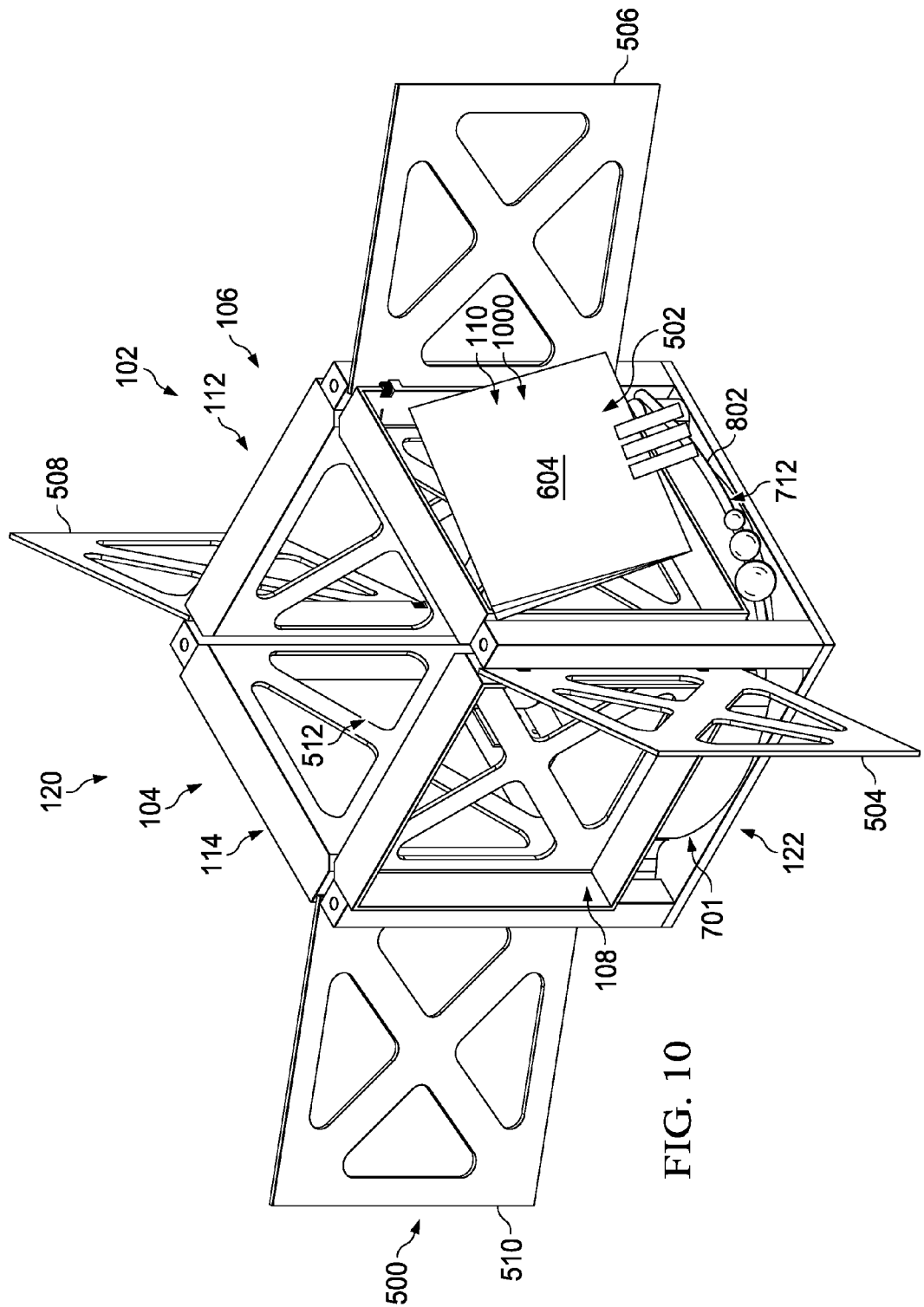
FIG. 10 is an illustration of a folded configuration of a panel for a satellite in accordance with an illustrative embodiment.

In FIG. 10, an illustration of a folded configuration of a panel for a satellite is depicted in accordance with an illustrative embodiment. In this illustrative example, door 506 has been opened and panel 604 is ready for deployment. Panel 604 is in folded configuration 1000. Panel 604 is configured to unfold into a flat, rectangular structure in this illustrative example.

Figure 11:
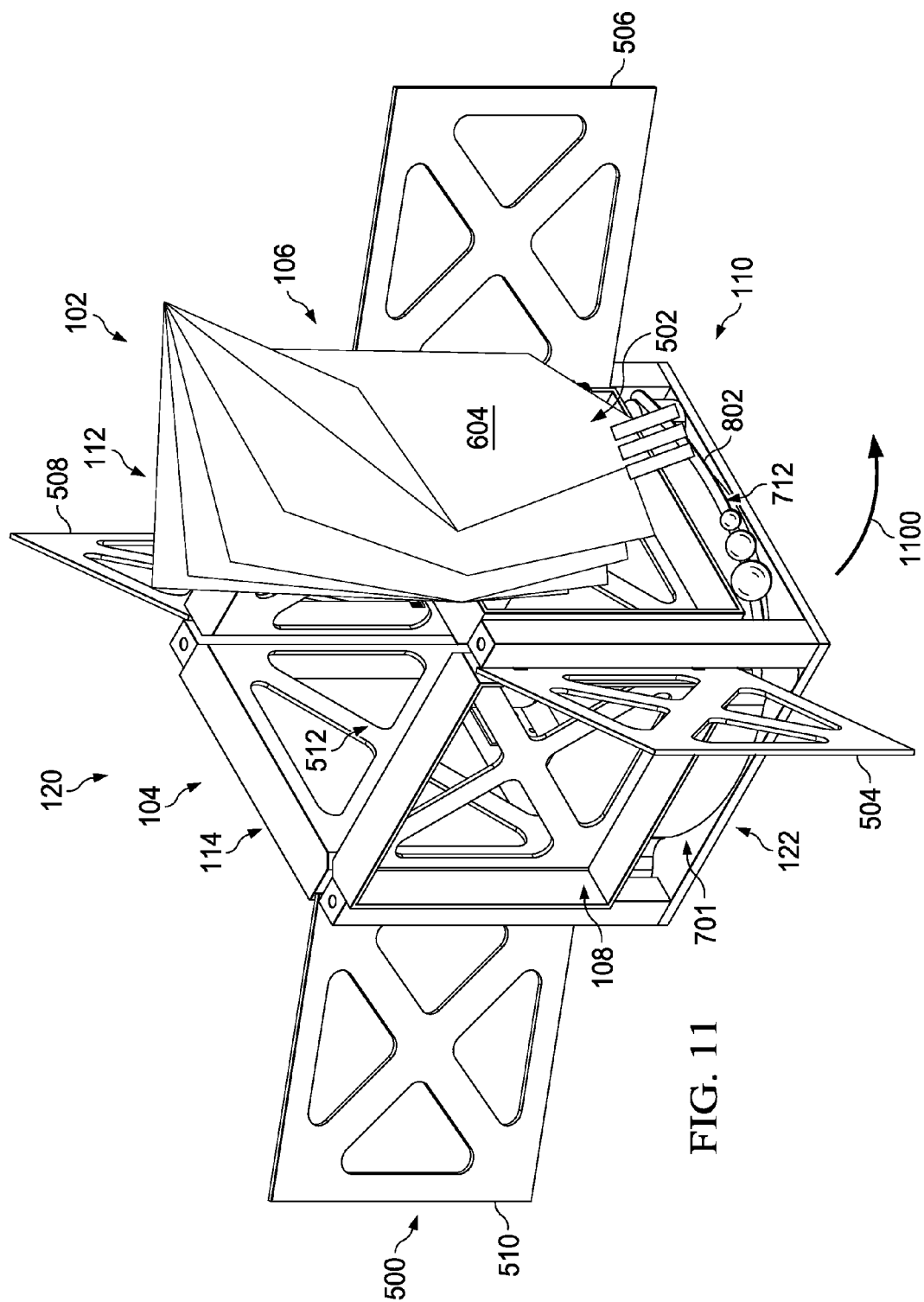
FIG. 11 is an illustration of a panel deploying from a satellite in accordance with an illustrative embodiment.

Turning to FIG. 11, an illustration of a panel deploying from a satellite is depicted in accordance with an illustrative embodiment. In this depicted example, the first motion of panel 604 is to unfold in half as door 506 opens.

Spring 710 (not shown in this view) has not started unwinding from spool 700 at this time. When spring 710 begins to unwind and moves spool 700, flexible rod 802 in group of flexible rods 712 extends in the direction of arrow 1100.

Figure 12:
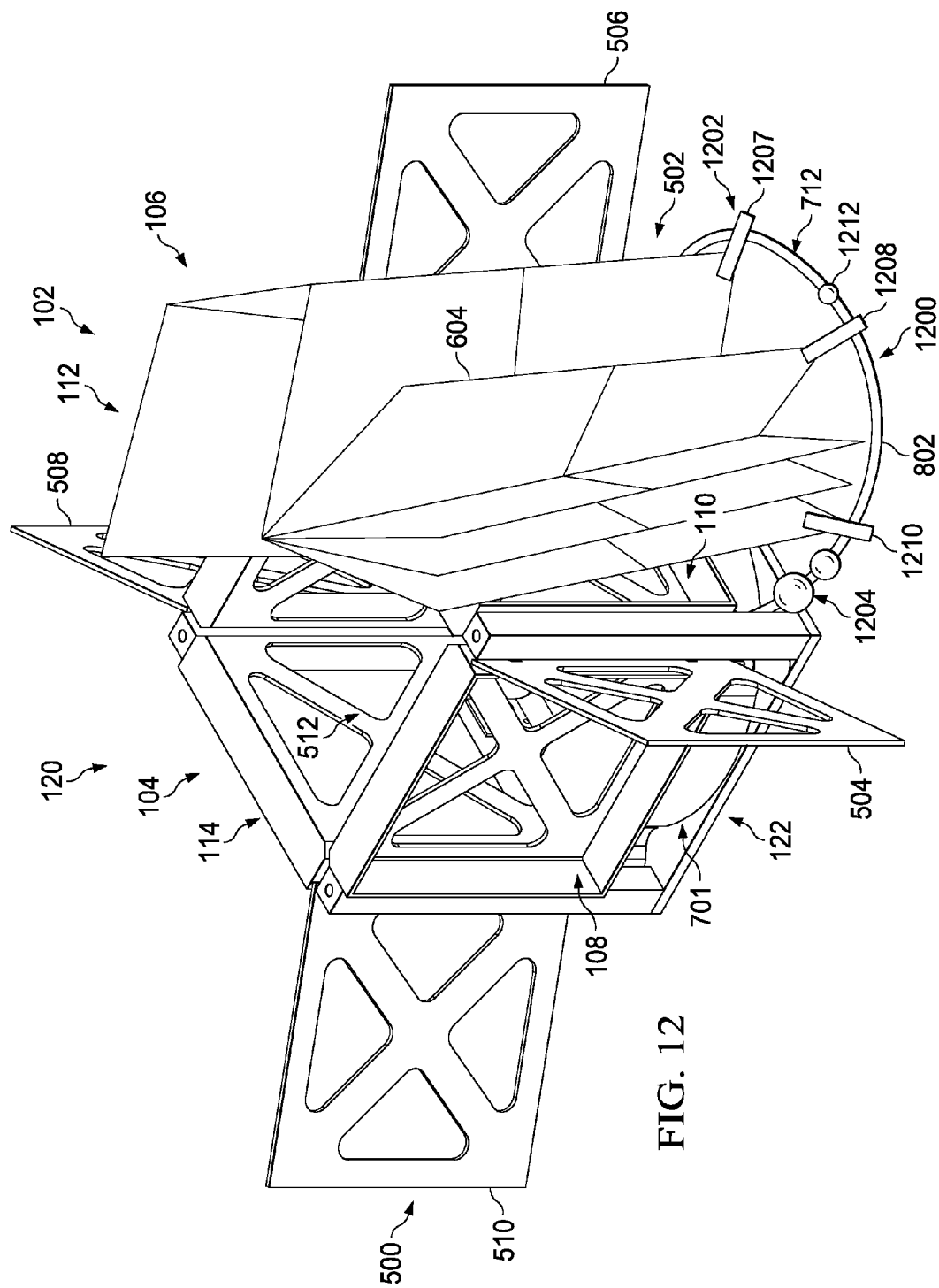
FIG. 12 is an illustration of a panel deploying from a satellite in accordance with an illustrative embodiment.

With reference next to FIG. 12, an illustration of a panel deploying from a satellite is depicted in accordance with an illustrative embodiment. In this depicted example, spring 710 begins to unwind from spool 700. As spring 710 unwinds from spool 700, flexible rod 802 in group of flexible rods 712 extends from satellite 102 causing panel 604 to further unfold.

In this illustrative example, interface system 1200 is associated with group of flexible rods 712 and panel 604. Interface system 1200 includes connectors 1202 and engagement structures 1204. Connectors 1202 are connected to panel 604, while engagement structures 1204 are connected to flexible rod 802.

Connectors 1202 for panel 604 include connector 1207, connector 1208, and connector 1210 in this illustrative example. Each one of connector 1207, connector 1208, and connector 1210 is attached to a different corner of panel 604. The fourth corner of panel 604 is attached to housing 104 of satellite 102 at a contact point (not shown in this view) on housing 104.

In this depicted example, each of engagement structures 1204 are configured to engage with one of connectors 1202. In particular, each of engagement structures 1204 is received by a channel (not shown in this view) in one of connectors 1202.

In this illustrative example, the channels in connectors 1202 are different sizes such that each of connectors 1202 engages with a different size of engagement structures 1204. In this manner, some engagement structures 1204 will pass through channels in connectors 1202 before engaging with a corresponding connector.

Engagement structure 1212 in engagement structures 1204 is shown in this view. Engagement structure 1212 is connected to flexible rod 802 and moves as flexible rod 802 is extended by deployment system 120. Engagement structure 1212 is configured to be received by a channel in connector 1207. Engagement structure 1212 passes through the channel in connector 1210 and the channel in connector 1208 before engaging with connector 1207.

Figure 13:
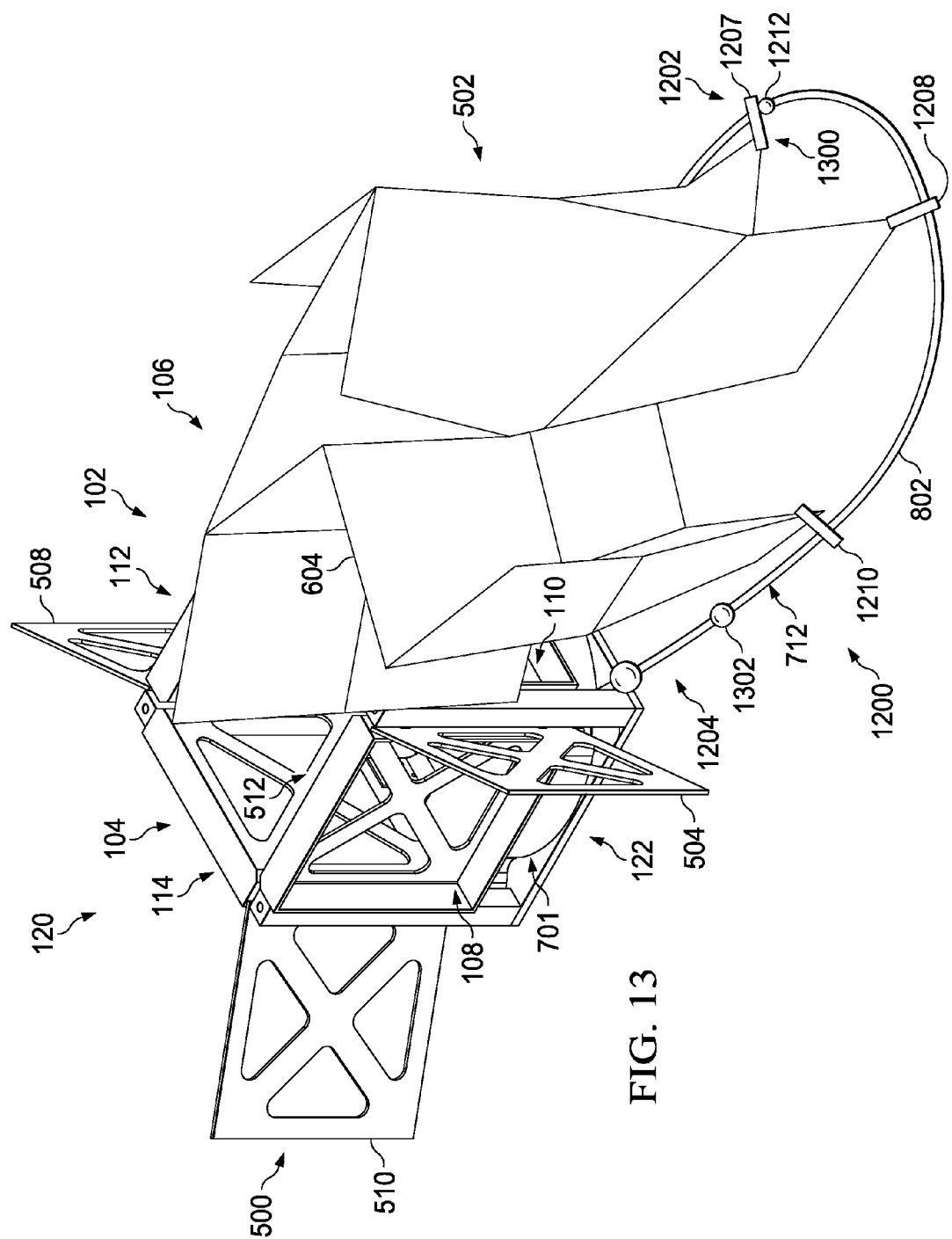
FIG. 13 is an illustration of a panel deploying from a satellite in accordance with an illustrative embodiment.

Referring to FIG. 13, an illustration of a panel deploying from a satellite is depicted in accordance with an illustrative embodiment. In this view, engagement structure 1212 has been received by a channel in connector 1207. Connector 1207 is attached to corner 1300 of panel 604 in this illustrative example.

The engagement of engagement structure 1212 with connector 1207 aids in unfolding panel 604 in a desired manner. In particular, the engagement of engagement structure 1212 with connector 1207 helps flatten panel 604.

In this depicted example, engagement structure 1302 in engagement structures 1204 is shown. Engagement structure 1302 is attached to flexible rod 802 and moves as flexible rod 802 is extended. Engagement structure 1302 is configured to be received by a channel in connector 1208.

As depicted, engagement structure 1302 passes through the channel in connector 1210 before engaging with the channel in connector 1208. In this view, engagement structure 1302 is moving out of chamber 701 shown in FIG. 7.

Figure 14:
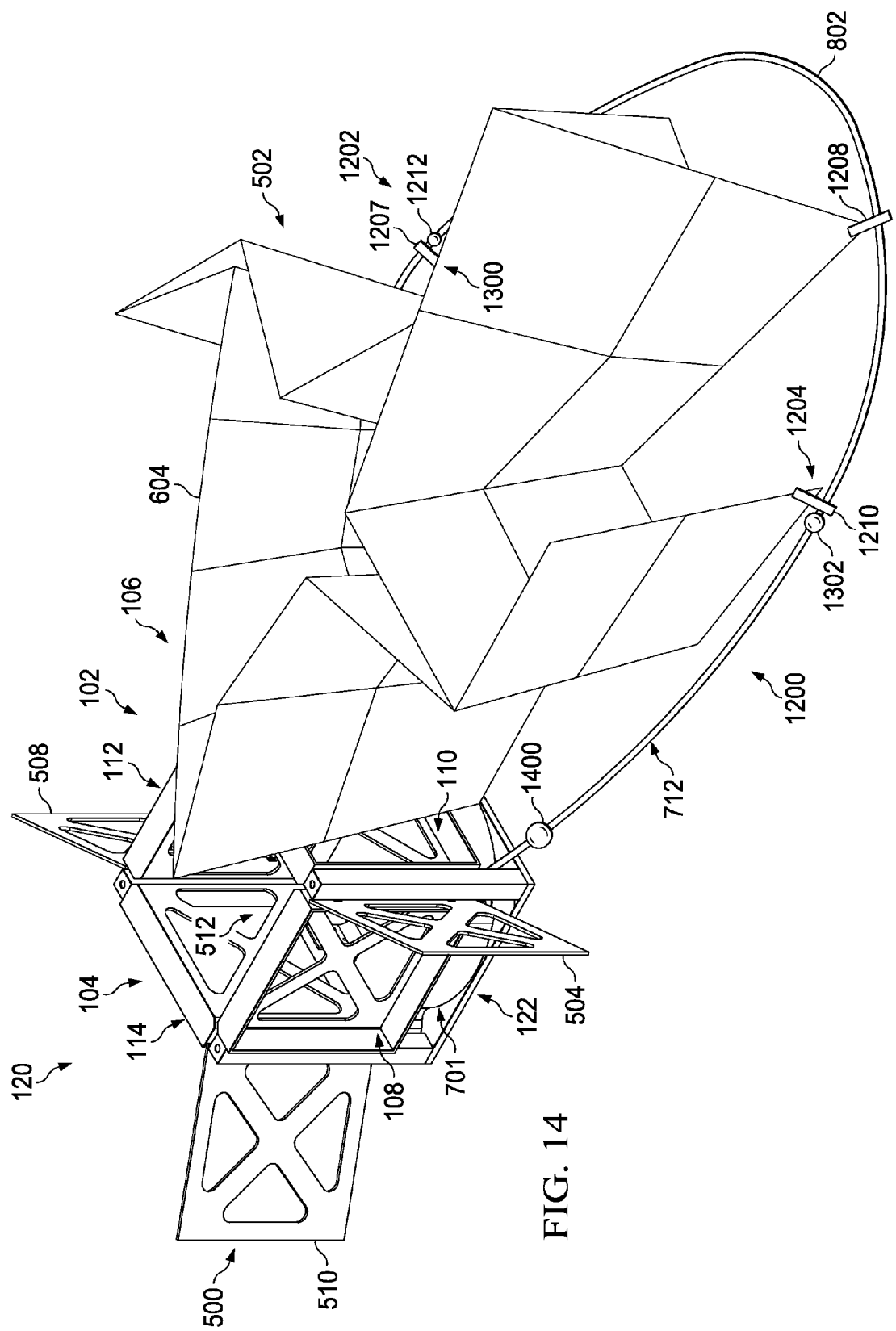
FIG. 14 is an illustration of a panel deploying from a satellite in accordance with an illustrative embodiment.

In FIG. 14, an illustration of a panel deploying from a satellite is depicted in accordance with an illustrative embodiment. Engagement structure 1400 in engagement structures 1204 is shown in this view. Engagement structure 1400 is connected to flexible rod 802 and moves as flexible rod 802 is extended by deployment system 120.

In this depicted example, engagement structure 1400 is configured to engage a channel in connector 1210. In this view, engagement structure 1400 is moving out of chamber 701 shown in FIG. 7.

Figure 15:
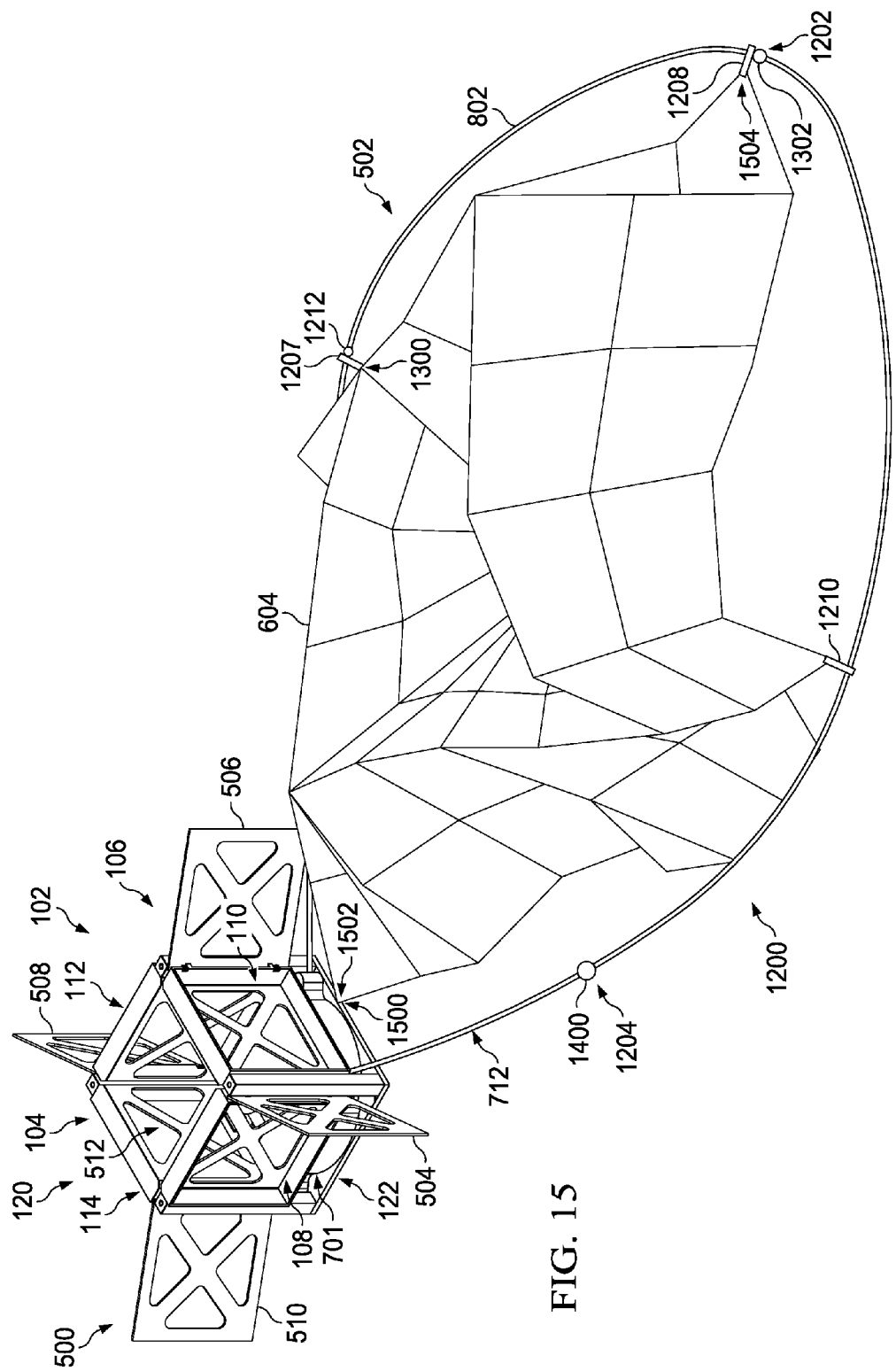
FIG. 15 is an illustration of a panel deploying from a satellite in accordance with an illustrative embodiment.

Referring next to FIG. 15, an illustration of a panel deploying from a satellite is depicted in accordance with an illustrative embodiment. In this depicted example, panel 604 is connected to housing 104 of satellite 102 at contact point 1500 on housing 104. In this illustrative example, corner 1502 of panel 604 is connected to housing 104 at contact point 1500.

As depicted, engagement structure 1302 has been received by a channel in connector 1208. Connector 1208 is connected to corner 1504 of panel 604 in this illustrative example. The engagement of engagement structure 1302 with connector 1208 further flattens panel 604.

Figure 16:
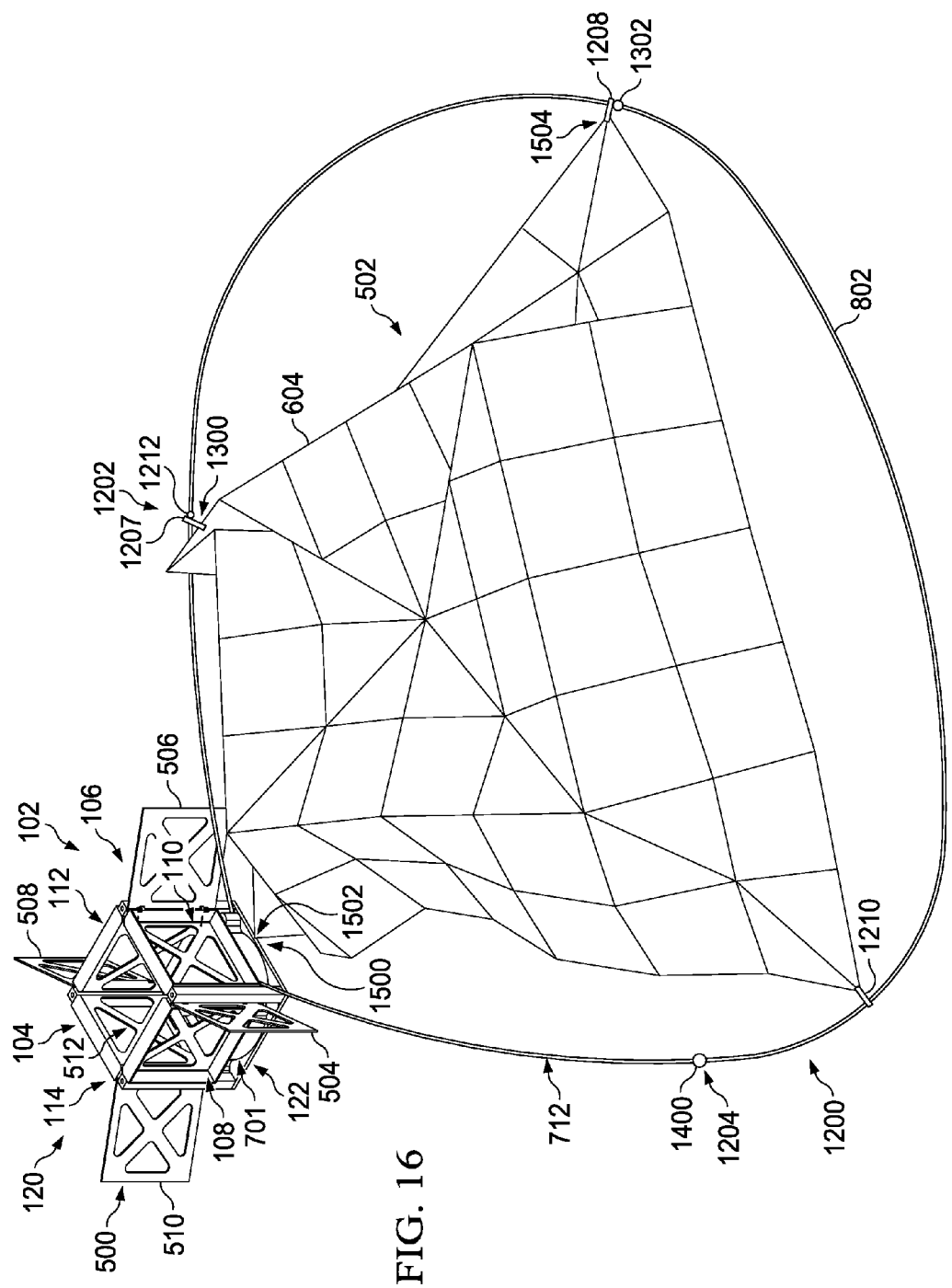
FIG. 16 is an illustration of a panel deploying from a satellite in accordance with an illustrative embodiment.

Next, in FIG. 16, an illustration of a panel deploying from a satellite is depicted in accordance with an illustrative embodiment. As more of flexible rod 802 is deployed from satellite 102, panel 604 continues to unfold and flatten.

Figure 17:
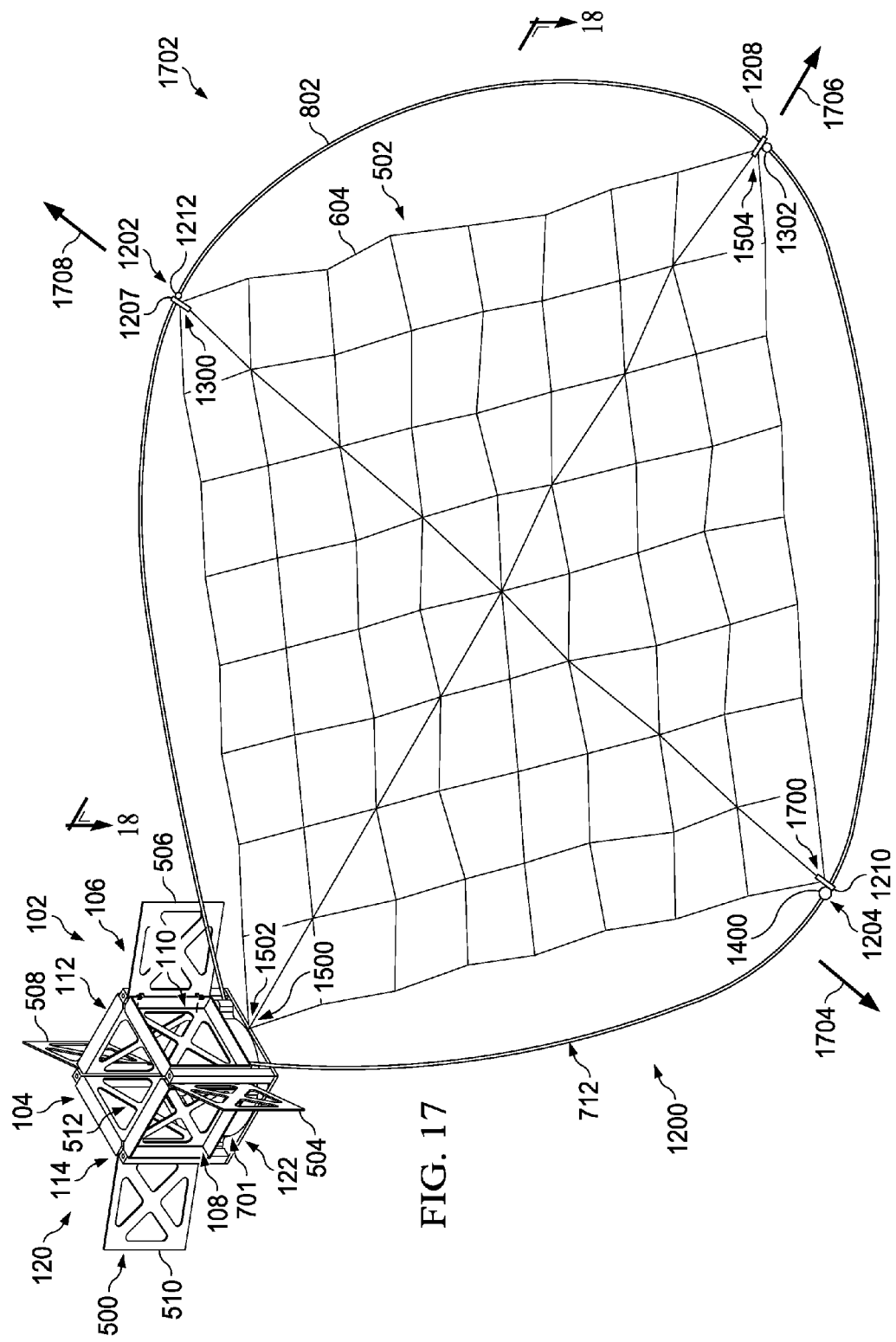
FIG. 17 is an illustration of a panel deploying from a satellite in accordance with an illustrative embodiment.

Turning now to FIG. 17, an illustration of a panel deploying from a satellite is depicted in accordance with an illustrative embodiment. In this view, engagement structure 1400 has been received by a channel in connector 1210. Connector 1210 is attached to corner 1700 of panel 604 in this illustrative example. When engagement structure 1400 is engaged with connector 1210, panel 604 flattens.

Panel 604 is now in deployed configuration 1702. Forces in the direction of arrow 1704, arrow 1706, and arrow 1708 continue to flatten panel 604 and hold panel 604 in deployed configuration 1702.

Figure 18:
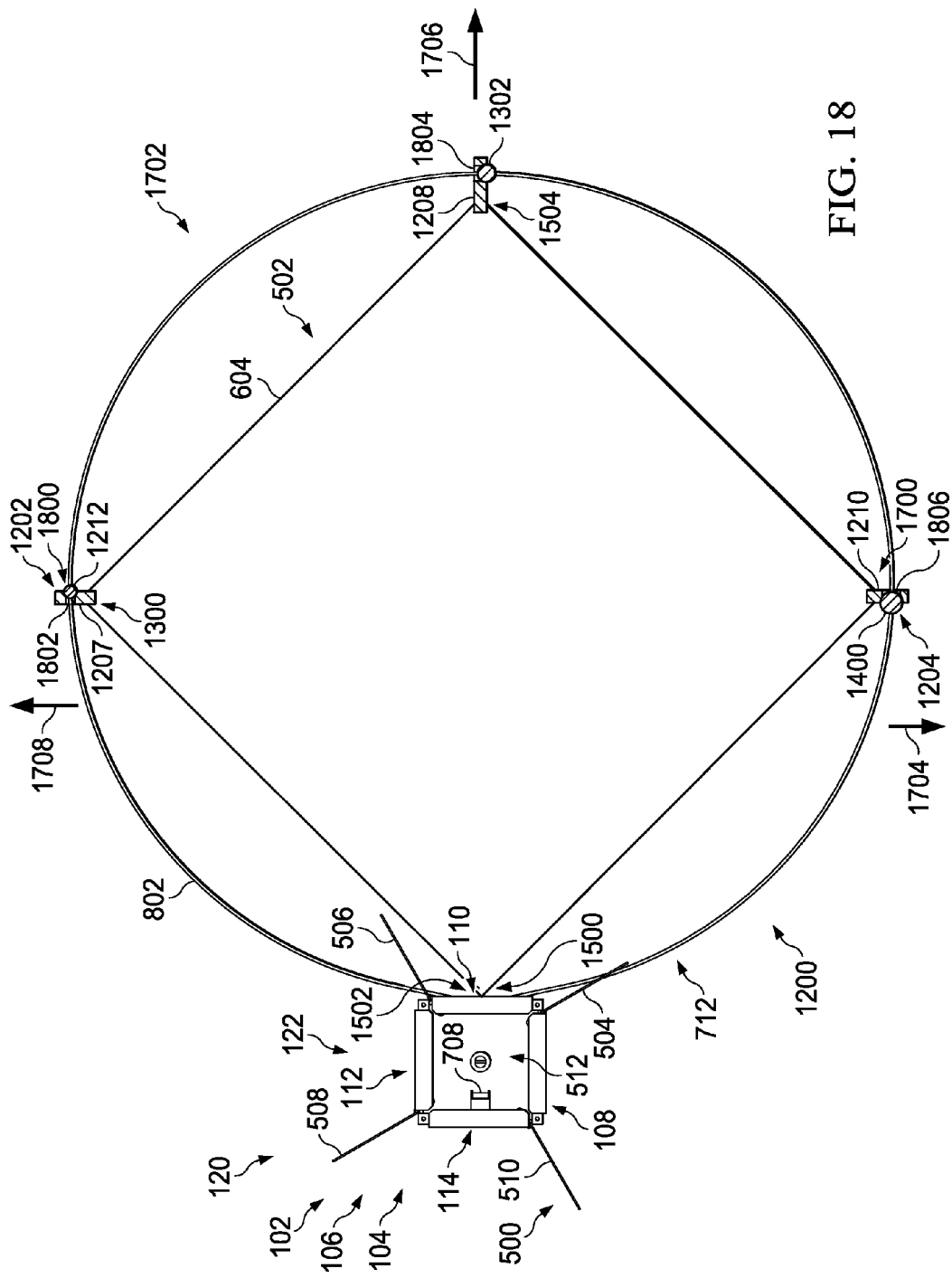
FIG. 18 is an illustration of a cross-sectional view of a panel in a deployed configuration and an interface system in accordance with an illustrative embodiment.

Referring next to FIG. 18, an illustration of a cross-sectional view of a panel in a deployed configuration and an interface system is depicted in accordance with an illustrative embodiment. In this depicted example, a cross-sectional view of panel 604 in deployed configuration 1702 with interface system 1200 taken along lines 18-18 in FIG. 17 is shown.

In this view, channels 1800 are present in connectors 1202. Channels 1800 include channel 1802, channel 1804, and channel 1806. Channel 1802 corresponds to connector 1207, channel 1804 corresponds to connector 1208, and channel 1806 corresponds to connector 1210.

As depicted, channel 1802, channel 1804, and channel 1806 are different sizes. In this illustrative example, channel 1802 is the smallest channel, channel 1804 is the next largest channel, and channel 1806 is the largest channel. The sizes for channels 1800 are selected such that only one of engagement structures 1204 is received by each of channels 1800. In this illustrative example, engagement structure 1212 passes through channel 1806 and channel 1804 before being received by channel 1802. In a similar fashion, engagement structure 1302 passes through channel 1806 before being received by channel 1804. Engagement structure 1400 is received by channel 1806 in this illustrative example.

Although FIGS. 10-18 show the deployment of panel 604, other panels in group of panels 600 may be deployed in a similar manner. In some examples, one or more of group of panels 600 may be deployed at the same time or at different times.

Additionally, although interface system 1200 is shown with three connectors 1202 and three engagement structures 1204, other numbers of connectors 1202 and corresponding engagement structures 1204 may be used. For instance, two connectors, four connectors, five connectors, twelve connectors, or some other number of pairs of connectors 1202 with corresponding engagement structures 1204 may be used to deploy panel 604.

Figure 19:
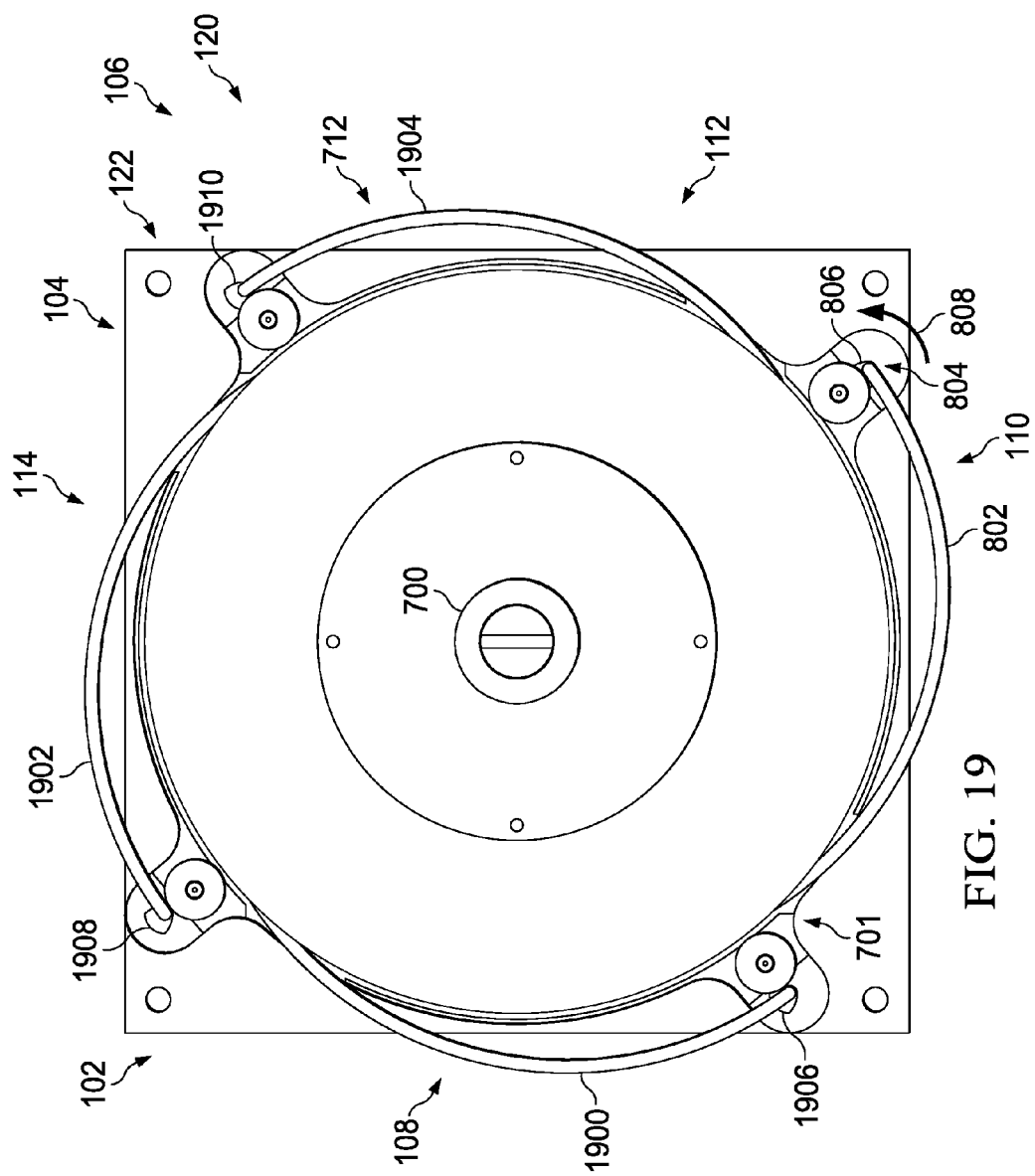
FIG. 19 is an illustration of a cross-sectional view of a deployment system for a satellite in accordance with an illustrative embodiment.
Figure 20:
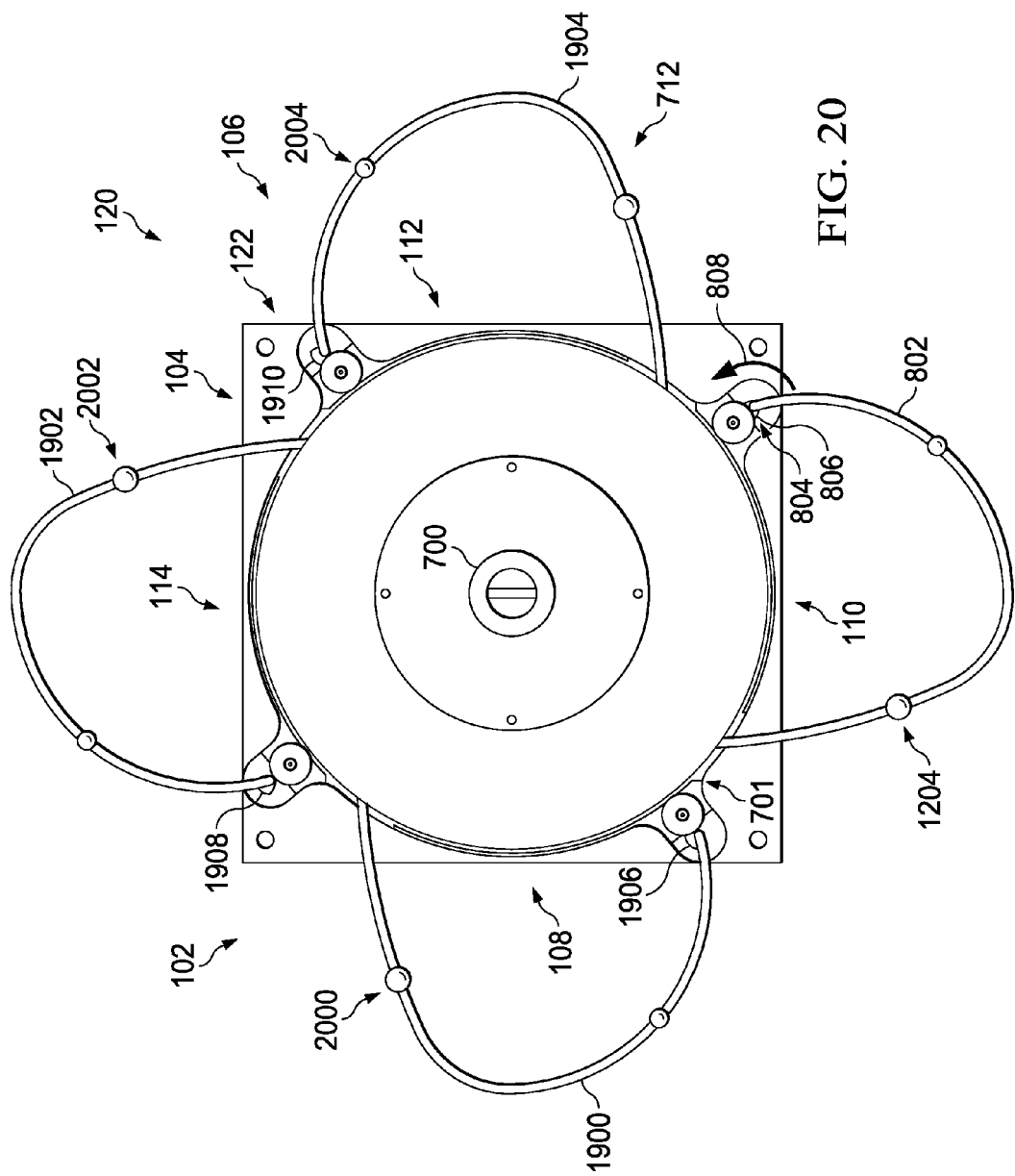
FIG. 20 is an illustration of a cross-sectional view of a deployment system for a satellite in accordance with an illustrative embodiment.
Figure 21:
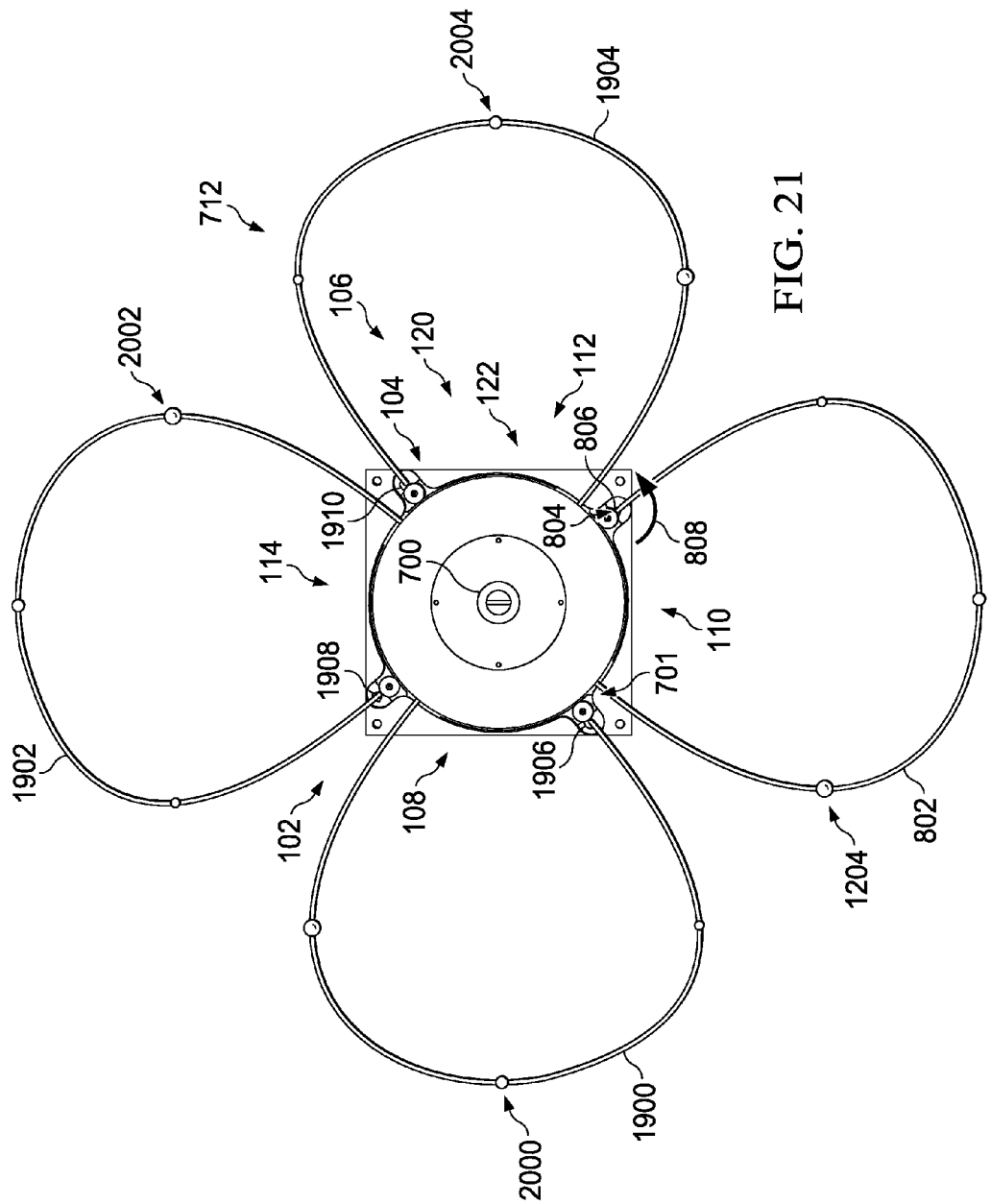
FIG. 21 is an illustration of a cross-sectional view of a deployment system for a satellite in accordance with an illustrative embodiment.

FIGS. 19-21 depict the deployment of a group of flexible rods from a satellite using a deployment system. Specifically, FIGS. 19-21 are illustrations of a cross-sectional view of satellite 102 with deployment system 120 taken along lines 19-19 in FIG. 6 as group of rods 612 are extended from deployment system 120. Group of flexible rods 712 are shown without group of panels 600 to illustrate the movement of group of flexible rods 712. Each of group of panels 600 unfolds in a similar manner to panel 604 shown in FIGS. 10-18.

In FIG. 19, an illustration of a cross-sectional view of a deployment system for a satellite is depicted in accordance with an illustrative embodiment. In this depicted example, group of flexible rods 712 has not started to extend from chamber 701 of deployment system 120.

Group of flexible rods 712 includes flexible rod 1900, flexible rod 1902, and flexible rod 1904 in addition to flexible rod 802. In this illustrative example, flexible rod 1900 is attached to barrel nut 1906, flexible rod 1902 is attached to barrel nut 1908, and flexible rod 1904 is attached to barrel nut 1910. Barrel nut 1906, barrel nut 1908, and barrel nut 1910 are configured to pivot as each corresponding flexible rod is extended, as described with respect to flexible rod 802 and barrel nut 806 in FIG. 8.

Referring next to FIG. 20, an illustration of a cross-sectional view of a deployment system for a satellite is depicted in accordance with an illustrative embodiment. In this depicted example, spring 710 has started to unwind from spool 700, as described in FIG. 9, causing group of flexible rods 712 to extend from chamber 701 of deployment system 120.

Engagement structures 2000 are also deployed from chamber 701 as group of flexible rods 712 are extended. In this illustrative example, engagement structures 2000 are attached to flexible rod 1900, engagement structures 2002 are attached to flexible rod 1902, and engagement structures 2004 are attached to flexible rod 1904 in this illustrative example.

Turning next to FIG. 21, an illustration of a cross-sectional view of a deployment system for a satellite is depicted in accordance with an illustrative embodiment. In this depicted example, group of flexible rods 712 are fully extended.

Figure 22:
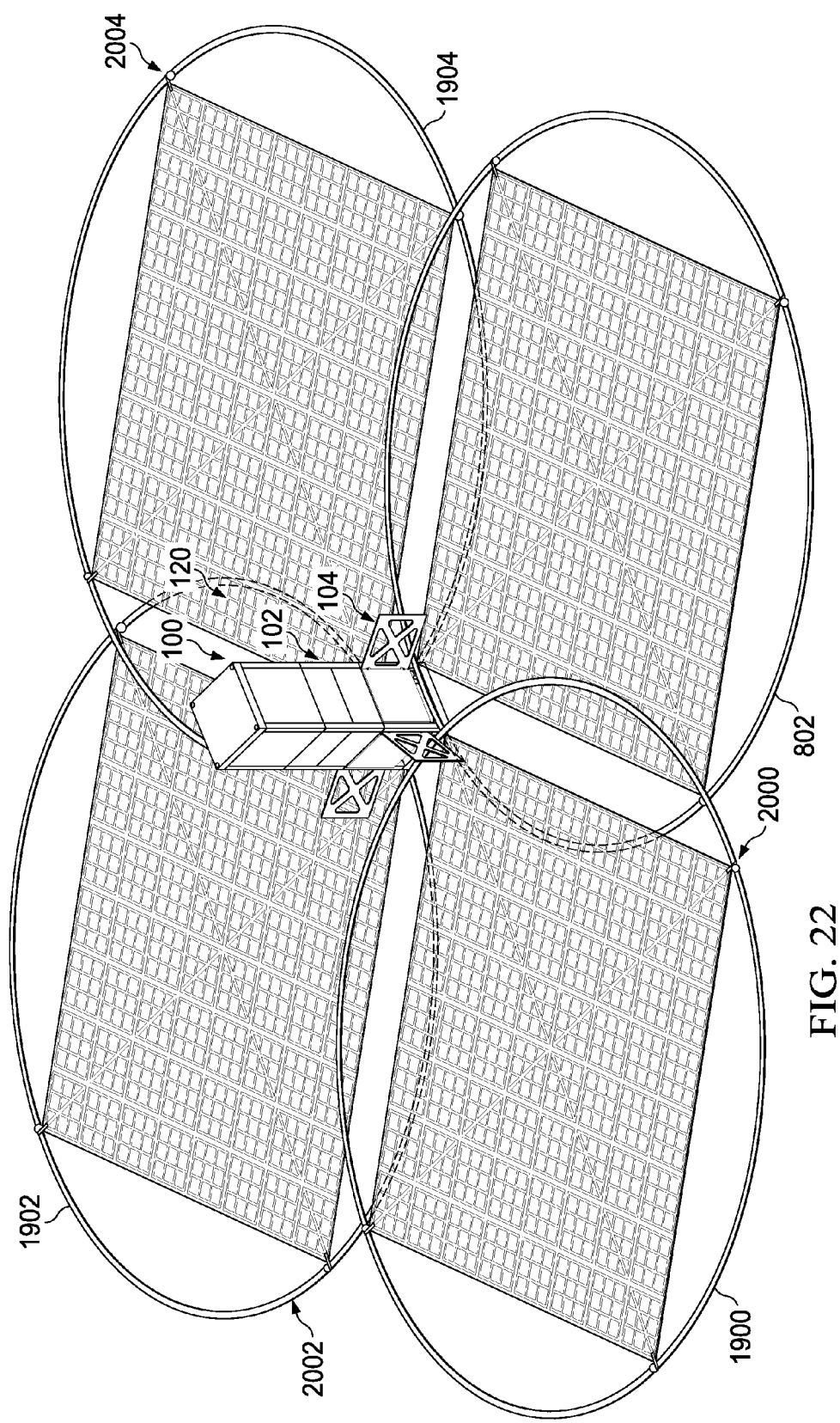
FIG. 22 is an illustration a satellite with a group of panels deployed from the satellite in accordance with an illustrative embodiment.

With reference to FIG. 22, an illustration a satellite with a group of panels deployed from the satellite is depicted in accordance with an illustrative embodiment. In this depicted example, satellite 102 is shown after group of panels 600 have been deployed from satellite 102 using deployment system 120 as described in FIGS. 10-21. In this view, all four panels in group of panels 600 have been deployed by deployment system 120. Group of panels 600 may be used to generate electricity for satellite 102.

Figure 23:
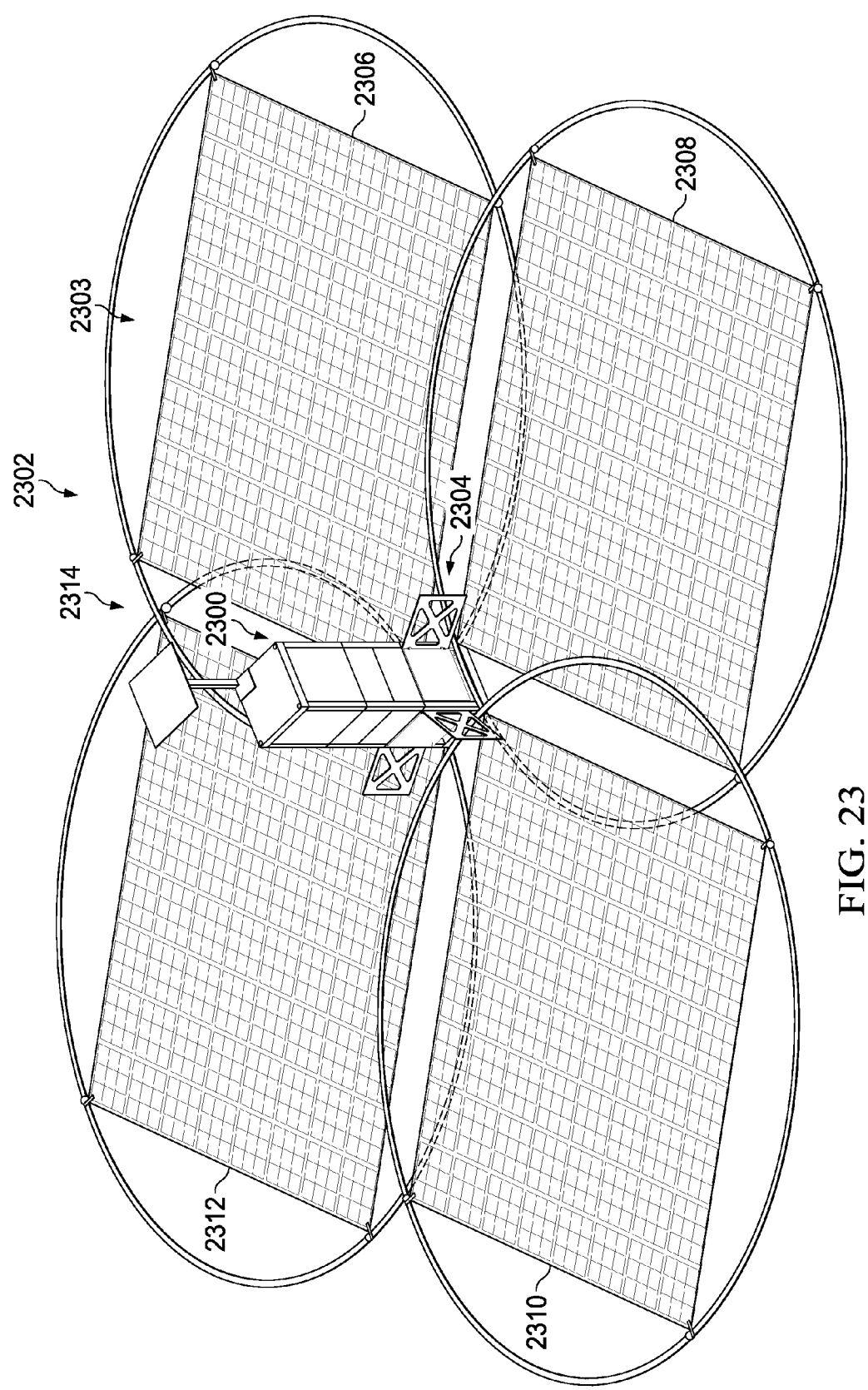
FIG. 23 is an illustration of a satellite with a group of panels deployed from the satellite in accordance with an illustrative embodiment.

In FIG. 23, an illustration of a satellite with a group of panels deployed from the satellite is depicted in accordance with an illustrative embodiment. In this depicted example, satellite 2300 is an example of another physical implementation for satellite 202 shown in block form in FIG. 2.

In this illustrative example, satellite 2300 is shown after group of panels 2302 have been deployed from satellite 2300 using deployment system 2304. Deployment system 2304 operates in a similar manner as deployment system 120 as described with reference to FIG. 1 and FIGS. 5-21.

As illustrated, group of panels 2302 are group of antenna reflector panels 2303. Group of antenna reflector panels 2303 comprises panel 2306, panel 2308, panel 2310, and panel 2312. Panel 2306, panel 2308, panel 2310, and panel 2312 are reflective antenna arrays in this illustrative example.

Panel 2306, panel 2308, panel 2310, and panel 2312 are part of antenna system 2314. Group of antenna reflector panels 2303 in antenna system 2314 is configured to reflect radio waves in a desired direction. In this illustrative example, the housing of satellite 2300 is used as part of the structure of antenna system 2314. The size of each of group of antenna reflector panels 2303 is not limited by the size of satellite 2300.

Figure 24:
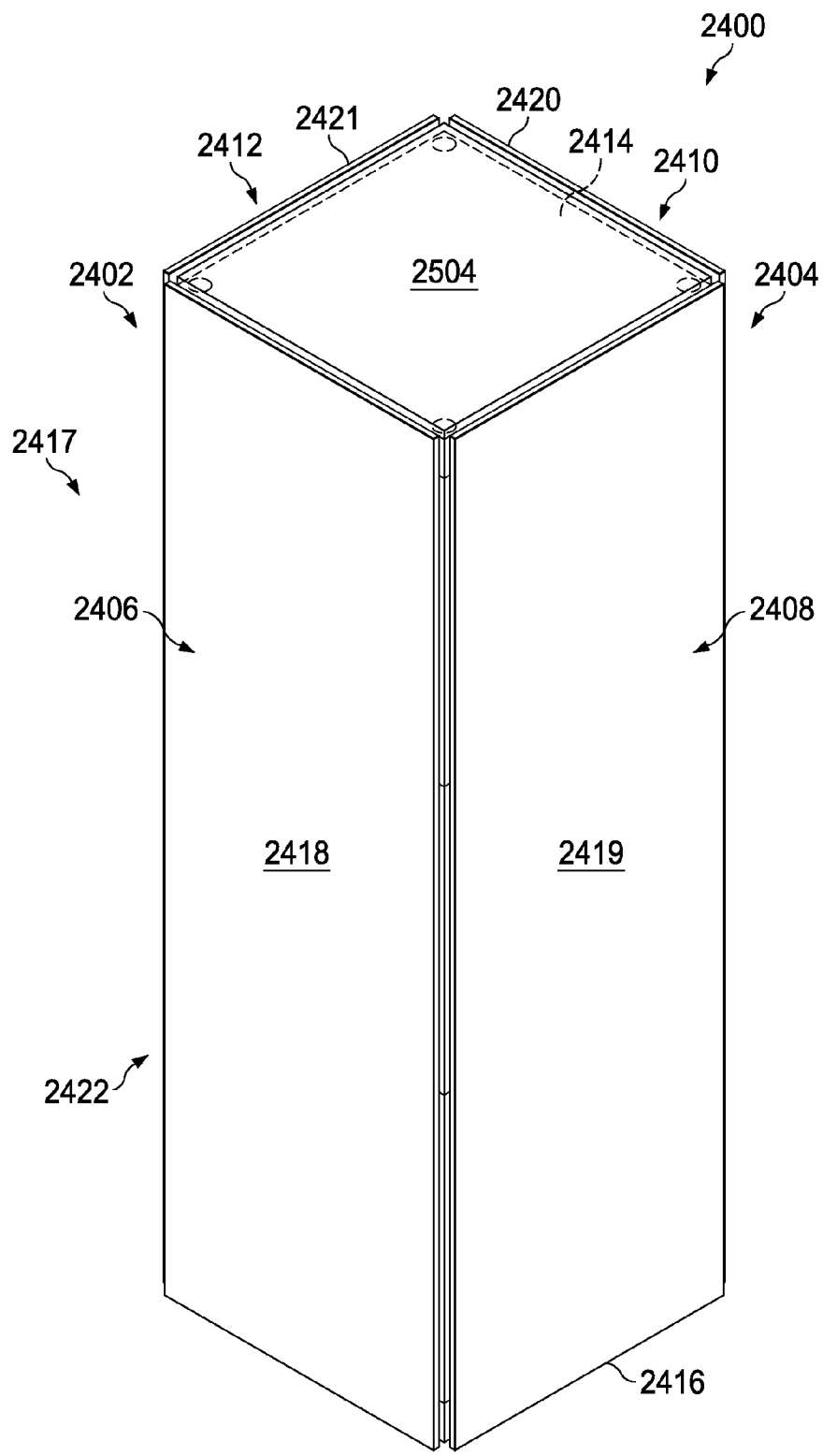
FIG. 24 is an illustration of a satellite in accordance with an illustrative embodiment.

Turning next to FIG. 24, an illustration of a satellite is depicted in accordance with an illustrative embodiment. In this depicted example, satellite 2400 is an example of another physical implementation for satellite 202 shown in block form in FIG. 2.

As depicted, satellite 2400 includes housing 2402 with number of sides 2404. Number of sides 2404 includes side 2406, side 2408, side 2410, and side 2412. Satellite 2400 also includes top plate 2414 and bottom plate 2416.

Satellite 2400 comprises group of solar panels 2417. Group of solar panels 2417 includes solar panel 2418, solar panel 2419, solar panel 2420, and solar panel 2421 in this illustrative example. Solar panel 2418, solar panel 2419, solar panel 2420, and solar panel 2421 are associated with side 2406, side 2408, and side 2410, and side 2412, respectively, of satellite 2400.

Satellite 2400 also includes deployment system 2422 in this illustrative example. Deployment system 2422 is associated with housing 2402 of satellite 2400. Deployment system 2422 is configured to deploy a group of components (not shown in this view) from satellite 2400 after solar panel 2418, solar panel 2419, solar panel 2420, and solar panel 2421 have been unfolded from satellite 2400.

Figure 25:
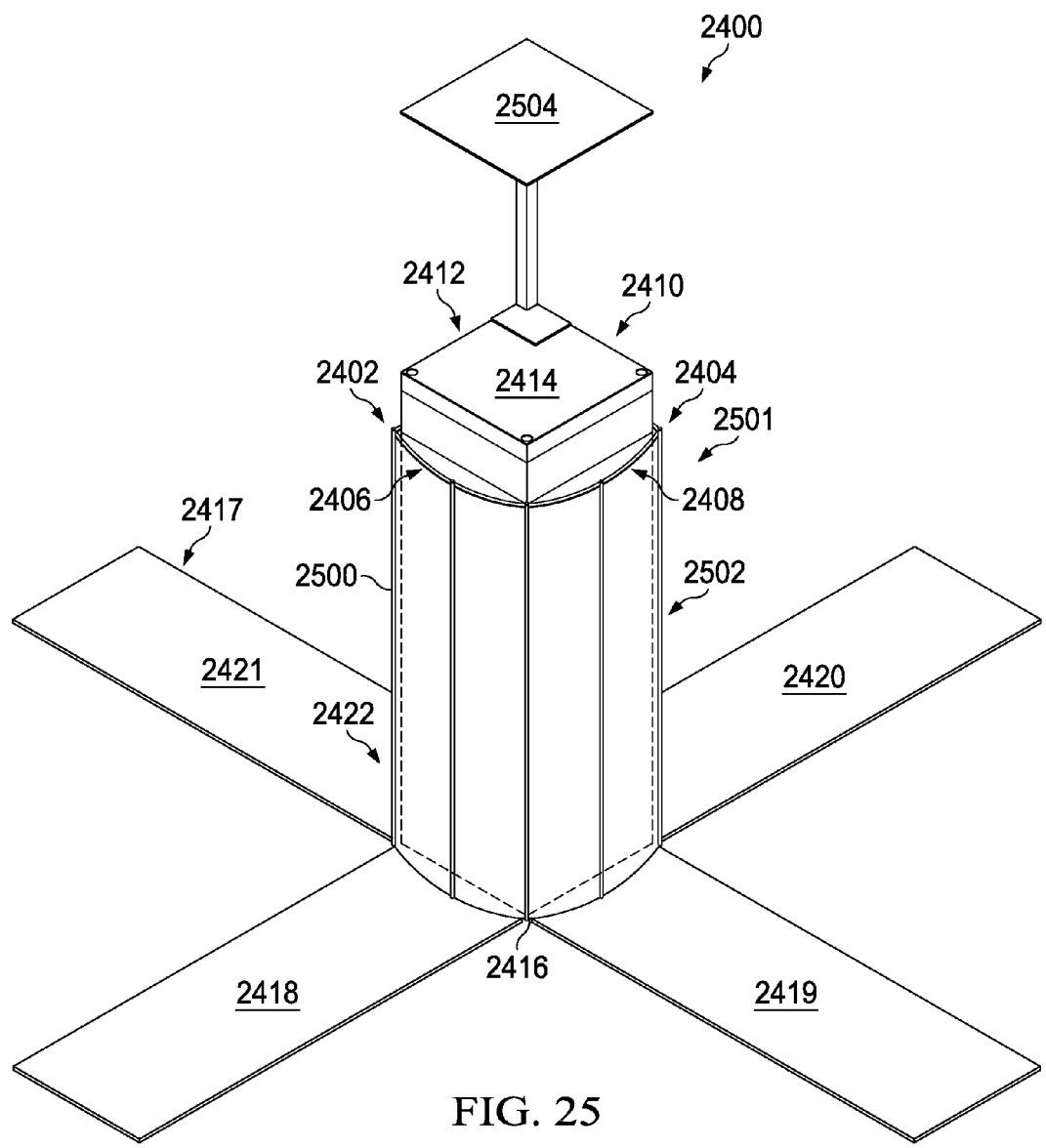
FIG. 25 is an illustration of a satellite in accordance with an illustrative embodiment.

With reference to FIG. 25, an illustration of a satellite is depicted in accordance with an illustrative embodiment. In this depicted example, satellite 2400 from FIG. 24 is shown with solar panel 2418, solar panel 2419, solar panel 2420, and solar panel 2421 in an unfolded position. Parabolic antenna reflector 2500 is in folded configuration 2501 around number of sides 2404 of satellite 2400. In this manner, parabolic antenna reflector 2500 is stored in folded configuration 2501 between group of solar panels 2417 and number of sides 2404 of satellite 2400 until deployed.

Parabolic antenna reflector 2500 is configured to be deployed using deployment system 2422. Deployment system 2422 is located in an upper section of satellite 2400 in this illustrative example. Deployment system 2422 may include a group of flexible rods, an interface system, and a deployment mechanism. The deployment mechanism extends the group of flexible rods from deployment system 2422 to deploy parabolic antenna reflector 2500, as described above.

Group of structural rods 2502 are attached to parabolic antenna reflector 2500. Group of structural rods 2502 are configured to deploy with parabolic antenna reflector 2500 such that parabolic antenna reflector 2500 has a desired shape.

In this depicted example, satellite 2400 also includes plate 2504. Plate 2504 is deployed from the top of satellite 2400 and used to focus electromagnetic signals to satellite 2400.

Figure 26:
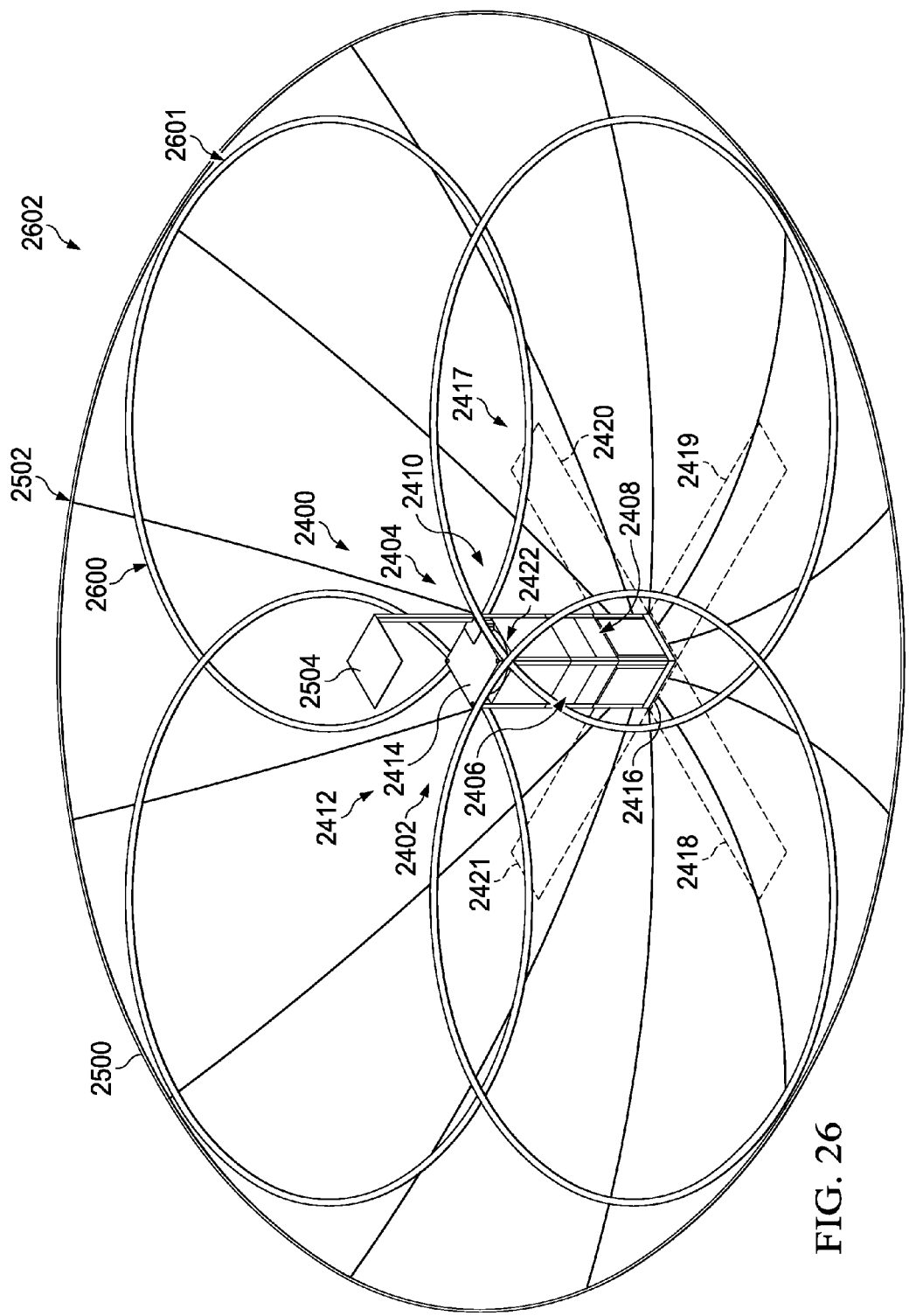
FIG. 26 is an illustration of a satellite with a group of components deployed from the satellite in accordance with an illustrative embodiment.

In FIG. 26, an illustration of a satellite with a group of components deployed from the satellite is depicted in accordance with an illustrative embodiment. In this depicted example, parabolic antenna reflector 2500 is in deployed configuration 2601.

The deployment is performed using group of flexible rods 2600 associated with parabolic antenna reflector 2500 and a deployment mechanism (not shown) configured to extend group of flexible rods 2600 as parabolic antenna reflector 2500 moves from folded configuration 2501 to deployed configuration 2601.

Group of structural rods 2502 deploy parabolic antenna reflector 2500 with a desired parabolic shape. Satellite 2400 is surrounded by parabolic antenna reflector 2500 when parabolic antenna reflector 2500 is in deployed configuration 2601.

In this illustrative example, the housing of satellite 2400 and parabolic antenna reflector 2500 form antenna system 2602. The housing of satellite 2400 is used as part of the structure of antenna system 2602. Plate 2504 is used to focus electromagnetic signals to antenna system 2602.

The illustrations of deployment system 120, deployment system 2304, and deployment system 2422, and the components within deployment system 120, deployment system 2304, and deployment system 2422 in FIG. 1 and FIGS. 5-26 are not meant to imply physical or architectural limitations to the manner in which an illustrative embodiment may be implemented. Other components in addition to or in place of the ones illustrated may be used. Some components may be optional.

For example, although solar panels and antenna reflector panels are shown being deployed from satellite 2400, deployment system 2422 also may deploy a drag device. In other illustrative examples, group of solar panels 2417 may be absent. Instead, parabolic antenna reflector 2500 may be deployed in response to a number of doors opening in deployment system 2422 to expose group of flexible rods 2600.

In still other illustrative examples, satellite 102 may be smaller than depicted in FIG. 1. For instance, satellite 102 may include only the space between group of panels 600 shown in FIG. 6. In this instance, electronics may be integrated within the space between group of panels 600. In other words, the entire spacecraft is bounded by the maximum linear dimensions of deployment system 120 shown in FIG. 5.

Figure 27:
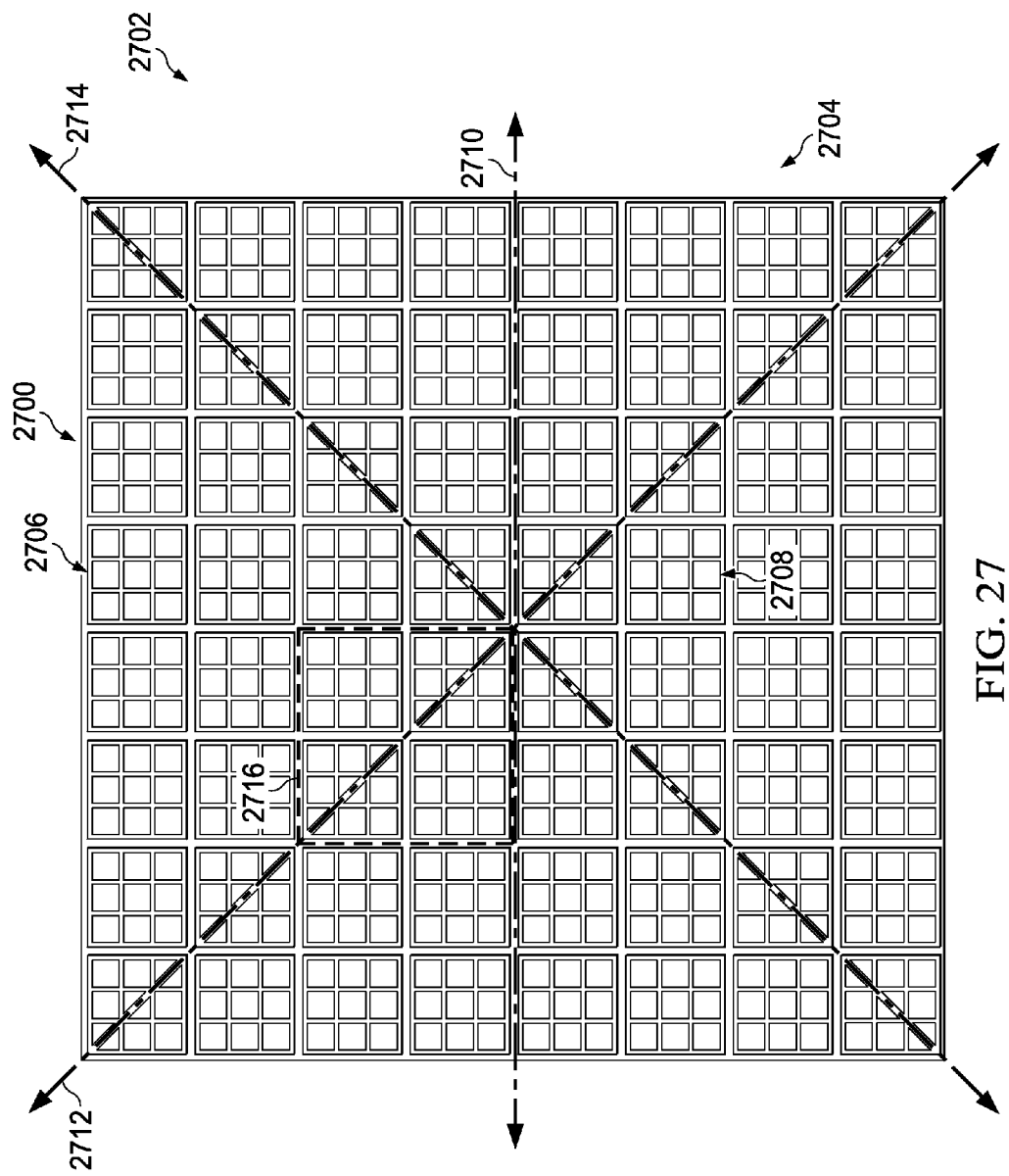
FIG. 27 is an illustration of a solar panel in accordance with an illustrative embodiment.

Referring next to FIG. 27, an illustration of a solar panel is depicted in accordance with an illustrative embodiment. In this depicted example, solar panel 2700 is an example of a physical implementation for solar panel 400 shown in block form in FIG. 4. Solar panel 2700 includes solar array 2702.

In this illustrative example, solar modules 2704 include first set of solar modules 2706 and second set of solar modules 2708. First set of solar modules 2706 include cells that may be folded along longitudinal axis 2710 of solar array 2702, while second set of solar modules 2708 include cells that may be folded along diagonal axis 2712 or diagonal axis 2714 of solar array 2702. Section 2716 of solar array 2702 comprises two of first set of solar modules 2706 and two of second set of solar modules 2708 in this illustrative example.

Figure 28:
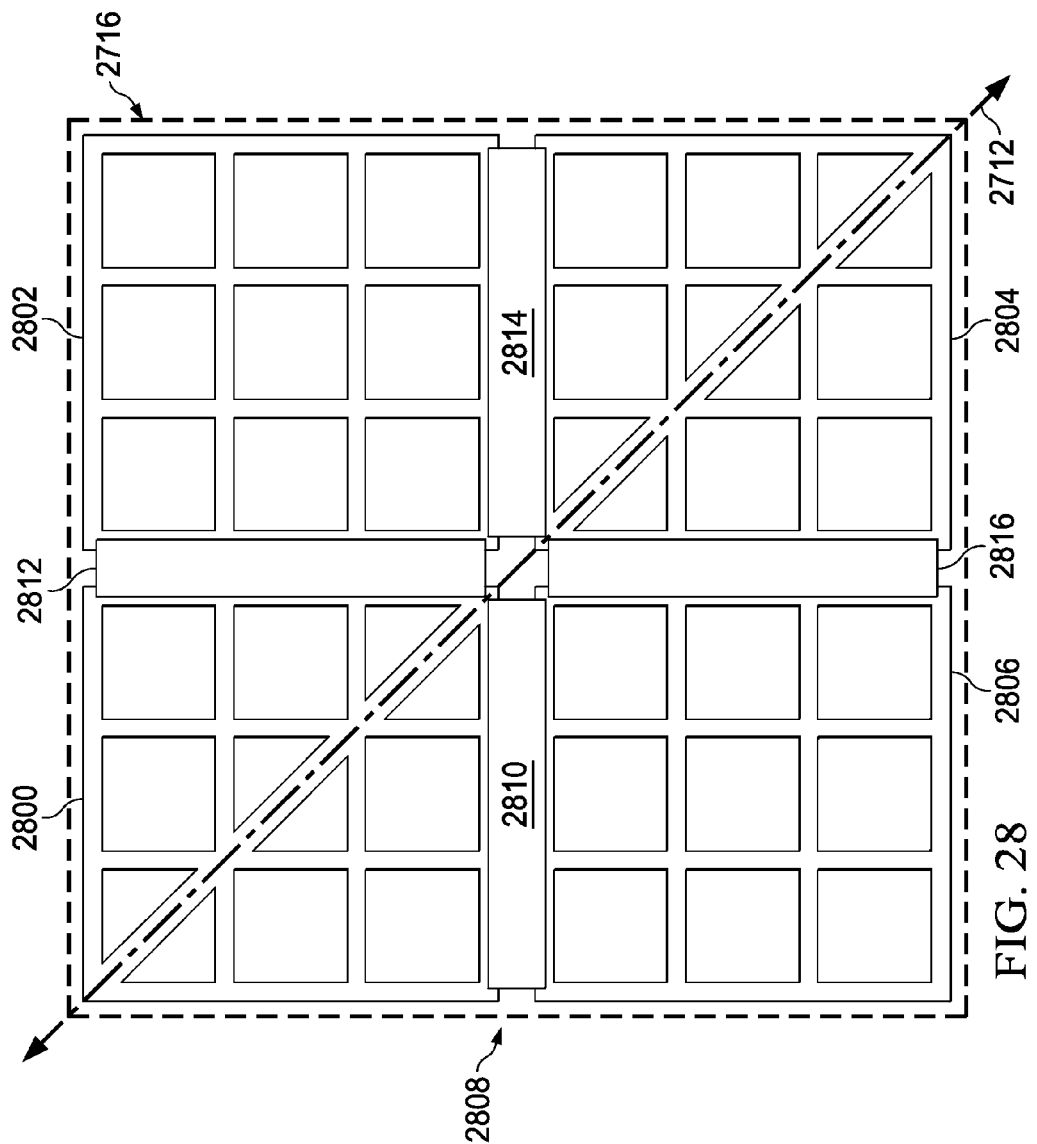
FIG. 28 is an illustration of a section of a solar array in accordance with an illustrative embodiment.

With reference next to FIG. 28, an illustration of a section of a solar array is depicted in accordance with an illustrative embodiment. In this depicted example, section 2716 of solar array 2702 from FIG. 27 is shown in greater detail.

As illustrated, section 2716 of solar array 2702 comprises solar module 2800, solar module 2802, solar module 2804, and solar module 2806. Solar module 2800 and solar module 2804 are part of first set of solar modules 2706 and configured to be folded along diagonal axis 2712. Solar module 2806 and solar module 2804 are part of second set of solar modules 2708 and configured to be folded along a longitudinal axis, such as longitudinal axis 2710 in FIG. 27.

In this illustrative example, solar module 2800, solar module 2802, solar module 2804, and solar module 2806 are attached to one another at connection points 2808. Connection points 2808 may include mechanical connections, electrical connections, or both. In this illustrative example, solar module 2800 is connected to solar module 2806 at connection point 2810 and solar module 2802 at connection point 2812. In a similar fashion, solar module 2804 is connected to solar module 2802 at connection point 2814 and solar module 2806 at connection point 2816.

In this depicted example, at connection points 2808, solar module 2800, solar module 2802, solar module 2804, and solar module 2806 are taped together and then electrically connected. In an illustrative example, the connection may be made using resistive welding. The tape used to connect each solar module may include an adhesive that comprises a material selected from at least one of silicone, acrylic, or some other suitable type of material.

Figure 29:
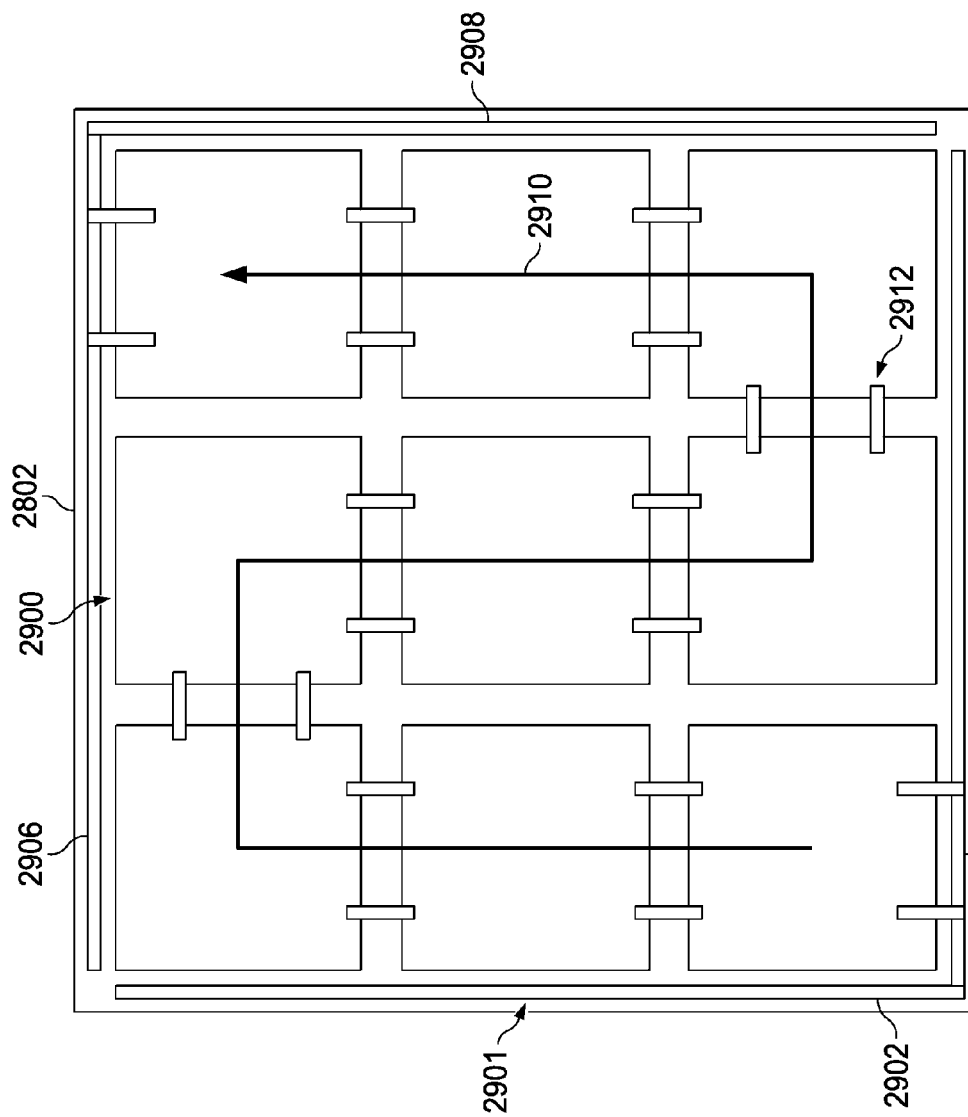
FIG. 29 is an illustration of a solar module in accordance with an illustrative embodiment.

In FIG. 29, an illustration of a solar module is depicted in accordance with an illustrative embodiment. In this depicted example, solar module 2802 from FIG. 28 is shown in greater detail.

As depicted, solar module 2802 comprises a number of solar cells 2900. Solar cells 2900 include nine cells in this illustrative example. In other illustrative examples, more or fewer cells may be present in solar module 2802 depending on the particular implementation.

In this depicted example, bus bars 2901 surround solar module 2802. Bus bars 2901 are conductive structures that surround solar module 2802.

In this illustrative example, bus bars 2901 include negative bus bar 2902, negative bus bar 2904, positive bus bar 2906, and positive bus bar 2908. Bus bars 2901 are configured to allow current to flow to other solar modules. In particular, current flows in the direction of arrow 2910 using interconnects 2912 electrically connecting solar cells 2900 to one another. In other words, arrow 2910 shows the energy path of solar module 2802. Interconnects 2912 comprise a conductive material selected from at least one of copper, gold, silver, or some other suitable type of material.

In other illustrative examples, bus bars 2901 are arranged in a different configuration than shown in this figure. For instance, the position of negative bus bar 2902 and negative bus bar 2904 may be switched with the position of positive bus bar 2906 and positive bus bar 2908. As a result, current will flow to other solar modules in a different manner.

Figure 30:
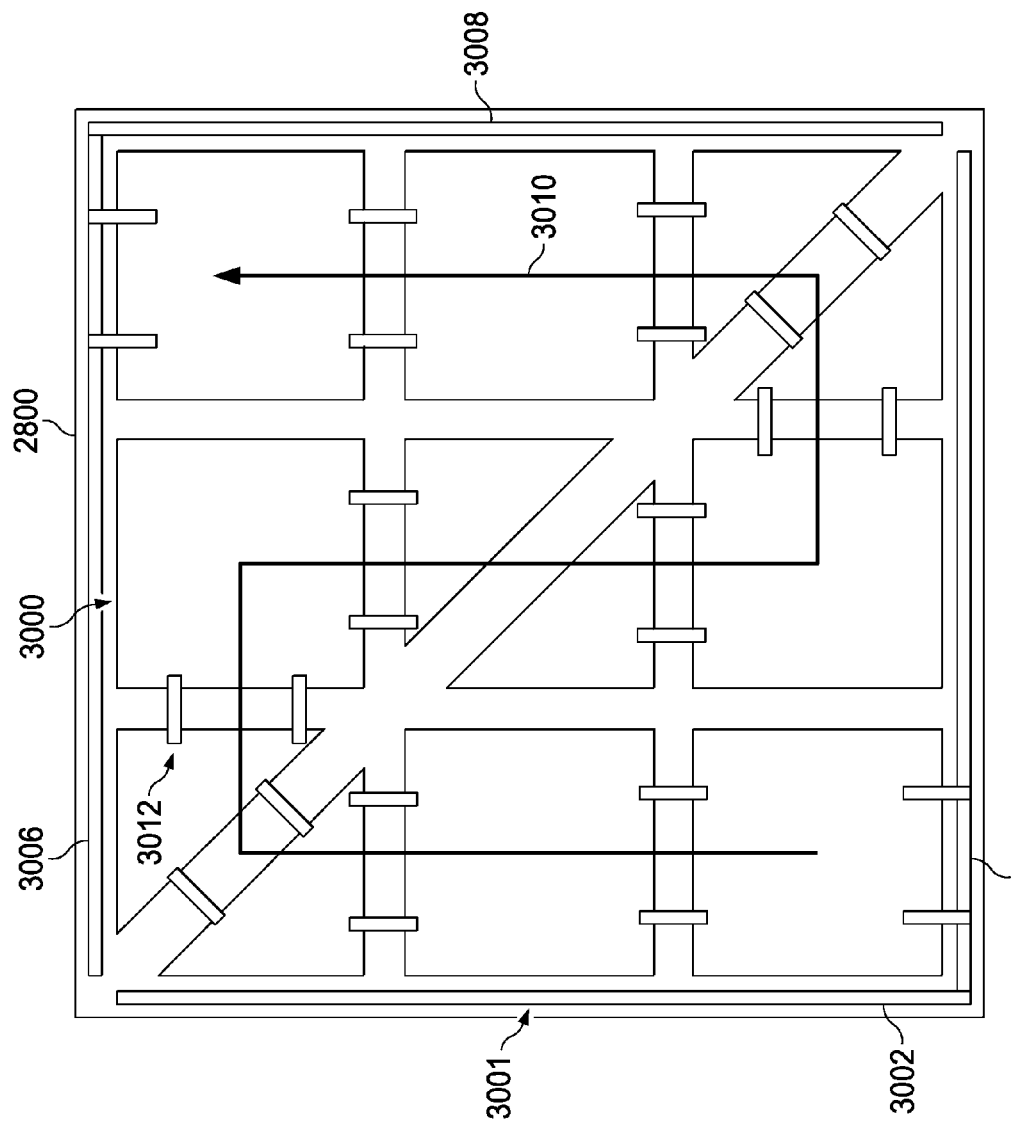
FIG. 30 is an illustration of a solar module in accordance with an illustrative embodiment.

Referring next to FIG. 30, an illustration of a solar module is depicted in accordance with an illustrative embodiment. In this depicted example, solar module 2800 from FIG. 28 is shown in greater detail.

As depicted, solar module 2800 comprises solar cells 3000. Solar cells 3000 include nine cells in this illustrative example. In other illustrative examples, more or fewer cells may be present in solar module 2800 depending on the particular implementation.

In this depicted example, bus bars 3001 surround solar module 2800. Bus bars 3001 include negative bus bar 3002, negative bus bar 3004, positive bus bar 3006, and positive bus bar 3008. Bus bars 3001 are configured to allow current to flow between solar modules. In particular, current flows in the direction of arrow 3010 using interconnects 3012 electrically connecting solar cells 3000 to one another. In other words, arrow 3010 shows the energy path of solar module 2800. Interconnects 3012 comprise a conductive material selected from at least one of copper, gold, silver, or some other suitable type of material.

The configuration of solar modules 2704 in solar array 2702 in FIGS. 27-30 allows solar panel 2700 to be folded into a folded configuration. In particular, first set of solar modules 2706 and second set of solar modules 2708 are configured to allow folding along an axis such that the risk of damage to one or more of the solar cells within solar array 2702 may be reduced.

Instead of folding solar modules 2704 across one or more solar cells within the modules, each of solar modules 2704 may be folded at a connection point. For instance, in one illustrative example, solar modules 2704 are folded at connections points between the modules, interconnects between solar cells within the module, or both. Moreover, the position of bus bars 2901 and bus bars 3001 in solar module 2802 and solar module 2800, respectively, allows for connections both vertically and horizontally during integration of solar module 2802 and solar module 2800 with other solar modules.

Figure 31:
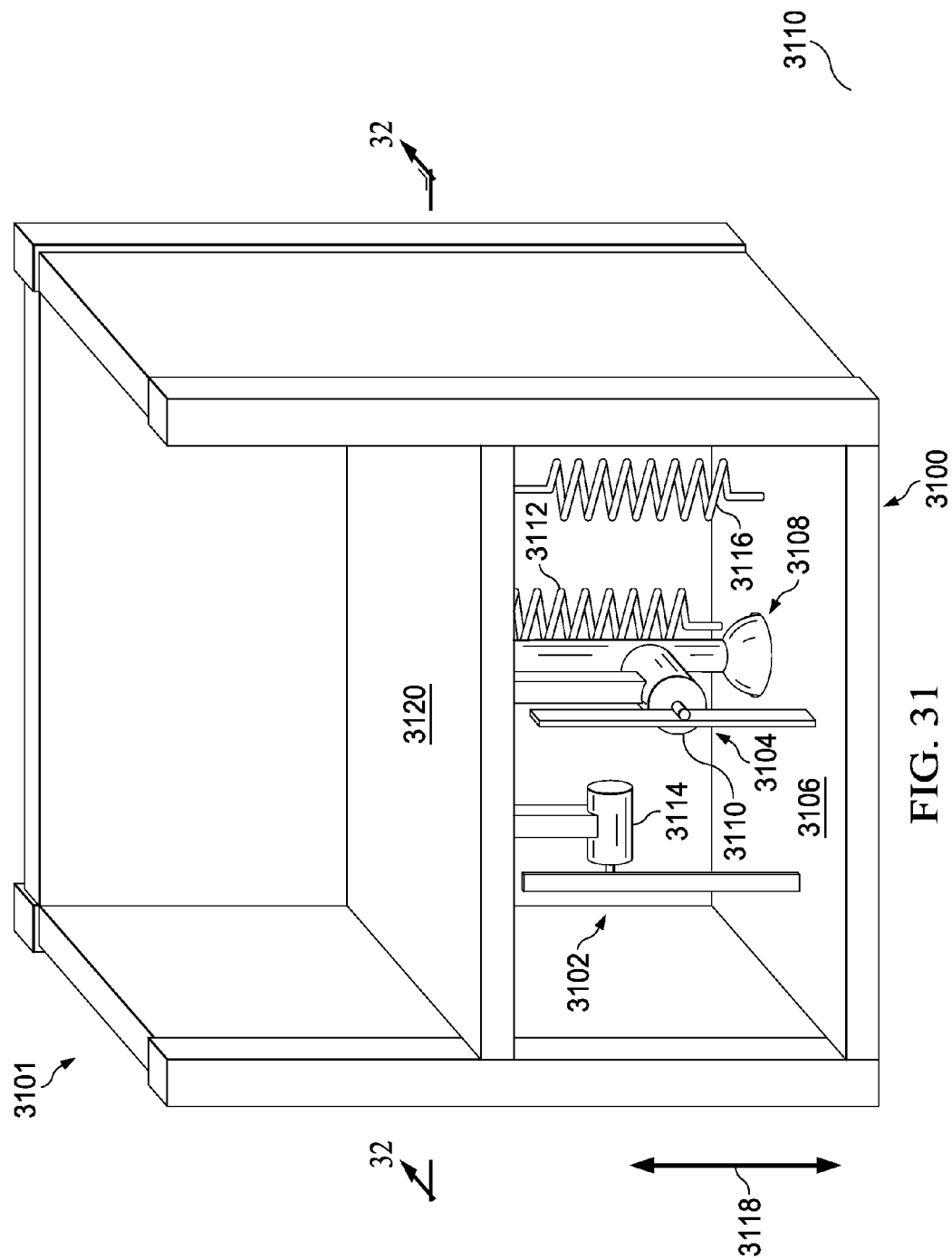
FIG. 31 is an illustration of a steering system for a satellite in accordance with an illustrative embodiment.

With reference next to FIG. 31, an illustration of a steering system for a satellite is depicted in accordance with an illustrative embodiment. In this depicted example, steering system 3100 is an example of a physical implementation for steering system 246 shown in block form in FIG. 2. In other illustrative examples, the components within steering system 3100 may be implemented in a different manner than shown in this figure, depending on the functionality involved.

In this depicted example, steering system 3100 is located in compartment 3101 of a satellite. For instance, compartment 3101 may be located within space 512 between group of panels 600 of deployment system 120 shown in FIG. 6. In another illustrative example, steering system 3100 may be located within a compartment above or below the deployment system in the housing of the satellite.

As depicted, steering system 3100 includes movement system 3102 and movement system 3104. Movement system 3102 and movement system 3104 are configured to move platform 3106 about pivot point 3108.

In this illustrative example, movement system 3102 includes actuator 3110 and spring 3112. Movement system 3104 includes actuator 3114 and spring 3116. Actuator 3110 and actuator 3114 may be rack and pinion linear actuators in this illustrative example. In other illustrative examples, actuator 3110 and actuator 3114 may take other forms, depending on the particular implementation.

As illustrated, actuator 3110 and actuator 3114 move in the direction of arrow 3118. For example, actuator 3110 and actuator 3114 extend and retract in the direction of arrow 3118.

In this depicted example, spring 3112 and spring 3116 are attached to the housing of the satellite. In particular, spring 3112 and spring 3116 are attached to plate 3120. Plate 3120 may form the upper portion of the housing of a deployment mechanism in the deployment system in this illustrative example.

Platform 3106 is configured to move in response to movement of actuator 3110, actuator 3114, or both. Platform 3106 moves about pivot point 3108 in this illustrative example. In this manner, platform 3106 is a gimbaled platform. The deployed components (not shown) are attached to platform 3106 such that the deployed components tilt as platform 3106 moves.

Steering system 3100 with movement system 3102 and movement system 3104 provides steering for the components deployed from the satellite over the mission lifetime of the satellite. With the use of movement system 3102 and movement system 3104, the deployed components may be moved to have a desired orientation. For instance, platform 3106 may be moved such that substantially all of the solar panels attached to the satellite are tilted such that the solar panels receive solar radiation.

Figure 32:
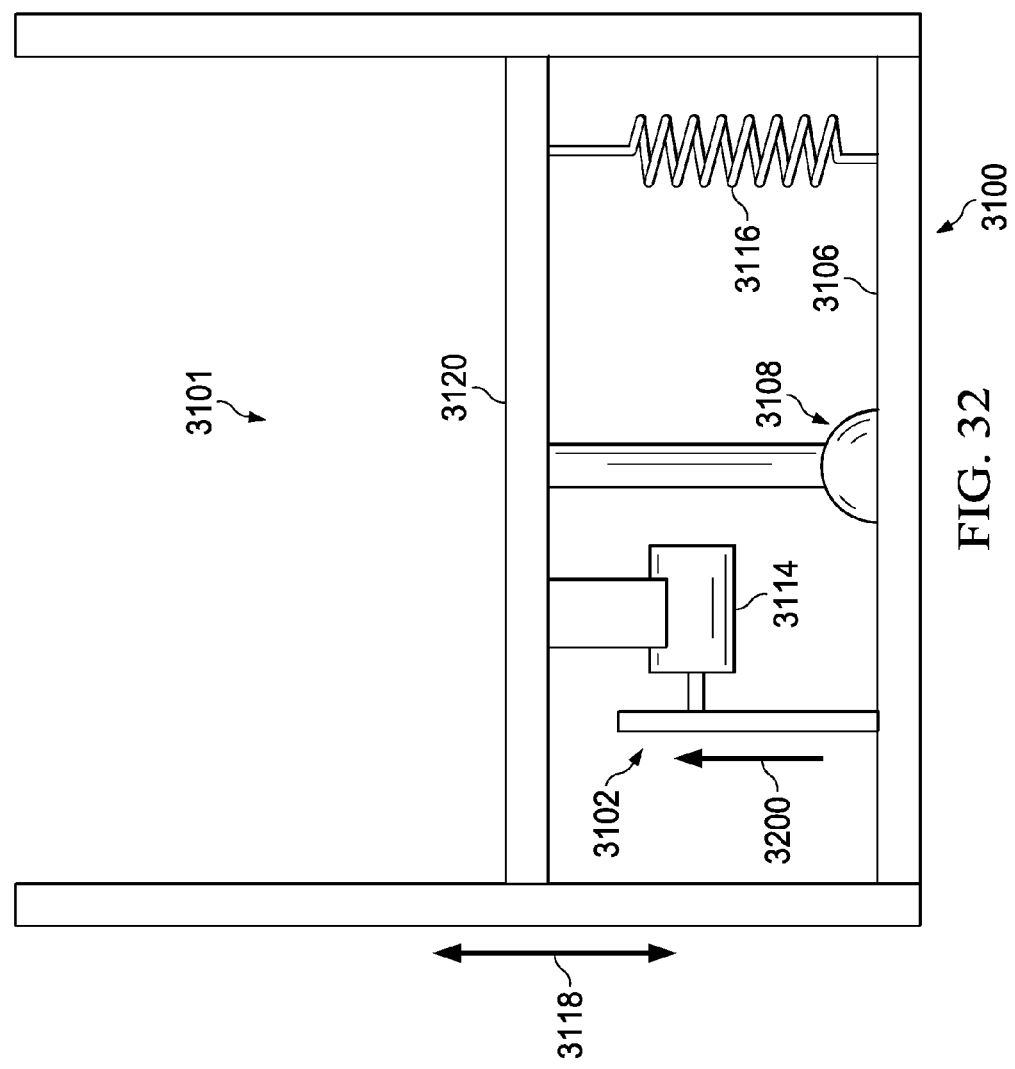
FIG. 32 is an illustration of a cross-sectional view of a steering system for a satellite in accordance with an illustrative embodiment.

Turning next to FIG. 32, an illustration of a cross-sectional view of a steering system for a satellite is depicted in accordance with an illustrative embodiment. In this depicted example, a cross-sectional view of steering system 3100 with movement system 3102 is shown taken along the lines 32-32 in FIG. 31. Actuator 3114 moves in the direction of arrow 3200 in this illustrative example.

Figure 33:
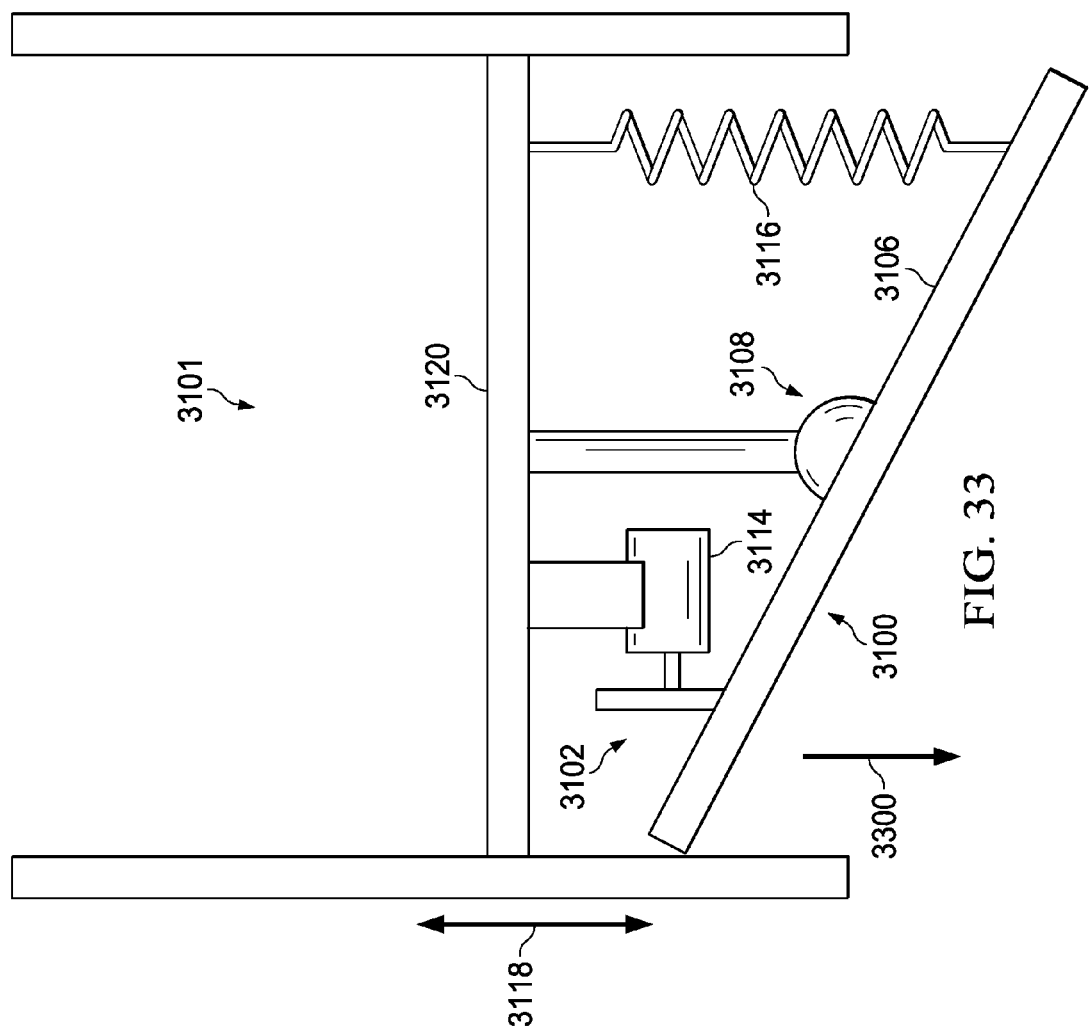
FIG. 33 is an illustration of a cross-sectional view of a steering system for a satellite in accordance with an illustrative embodiment.

In FIG. 33, an illustration of a cross-sectional view of a steering system for a satellite is depicted in accordance with an illustrative embodiment. In this illustrative example, actuator 3114 has moved in the direction of arrow 3200 shown in FIG. 32, resulting in the movement of platform 3106. Next, actuator 3114 moves in the direction of arrow 3300.

Figure 34:
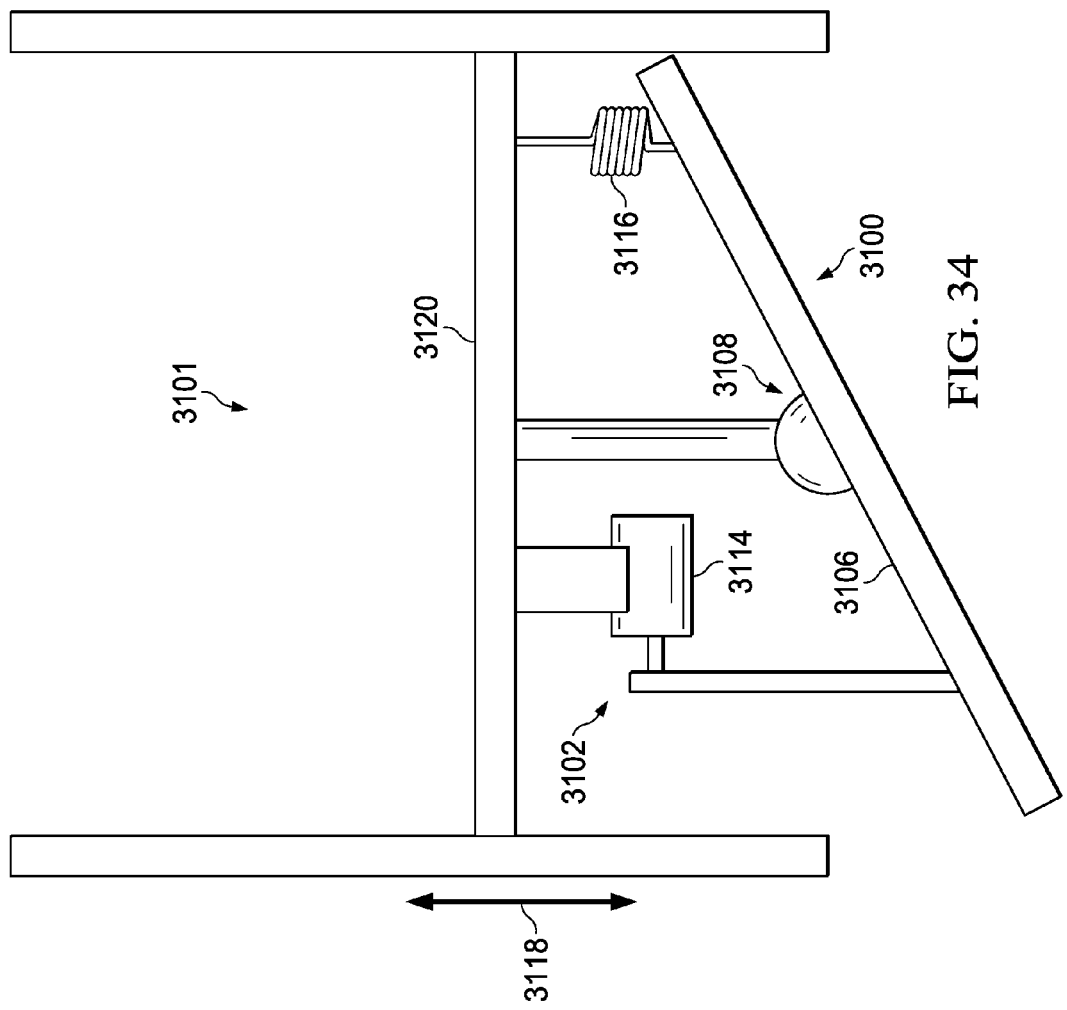
FIG. 34 is an illustration of a cross-sectional view of a steering system for a satellite in accordance with an illustrative embodiment.

With reference next to FIG. 34, an illustration of a cross-sectional view of a steering system for a satellite is depicted in accordance with an illustrative embodiment. In this illustrative example, actuator 3114 has moved in the direction of arrow 3300 shown in FIG. 33, resulting in the movement of platform 3106. In another illustrative example, steering system 3100 may be implemented for the orthogonal axis to provide complete control over the plane of the deployed components.

The illustrations of solar modules 2704 in solar array 2702 in FIGS. 27-30 and steering system 3100 in FIGS. 31-34 are not meant to imply physical or architectural limitations to the manner in which an illustrative embodiment may be implemented. Other components in addition to or in place of the ones illustrated may be used. Some components may be optional.

Moreover, the different components shown in FIG. 1 and FIGS. 5-34 may be illustrative examples of how components shown in block form in FIGS. 2-4 can be implemented as physical structures. Additionally, some of the components in FIG. 1 and FIGS. 5-34 may be combined with components in FIGS. 2-4, used with components in FIGS. 2-4, or a combination of the two.

Figure 35:
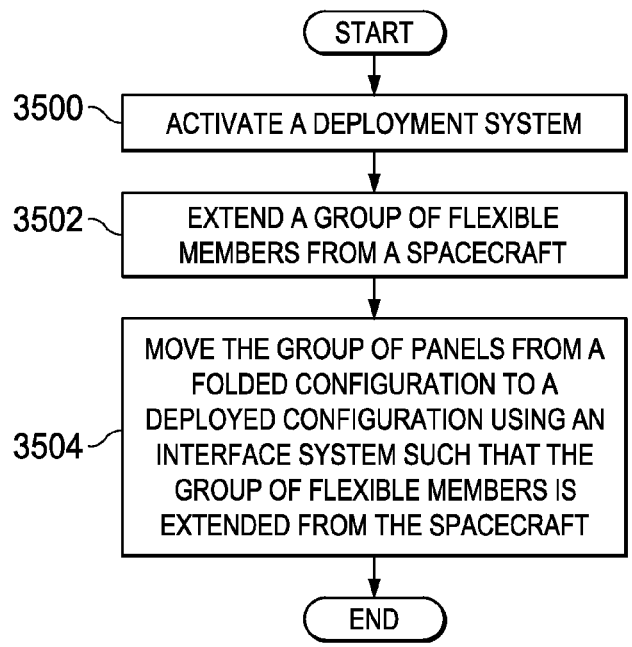
FIG. 35 is an illustration of a flowchart of a process for deploying a group of panels in accordance with an illustrative embodiment.

With reference now to FIG. 35, an illustration of a flowchart of a process for deploying a group of panels is depicted in accordance with an illustrative embodiment. The process described in FIG. 35 may be implemented using deployment system 210 in satellite 202 in FIG. 2.

The process begins by activating a deployment system (operation 3500). For instance, a launch lock in the deployment system may activate the deployment system.

Next, the process extends a group of flexible members from a spacecraft (operation 3502). In this illustrative example, the spacecraft is a satellite.

The group of panels is then moved from a folded configuration to a deployed configuration using an interface system such that the group of flexible members is extended from the spacecraft (operation 3504) with the process terminating thereafter.

Figure 36:
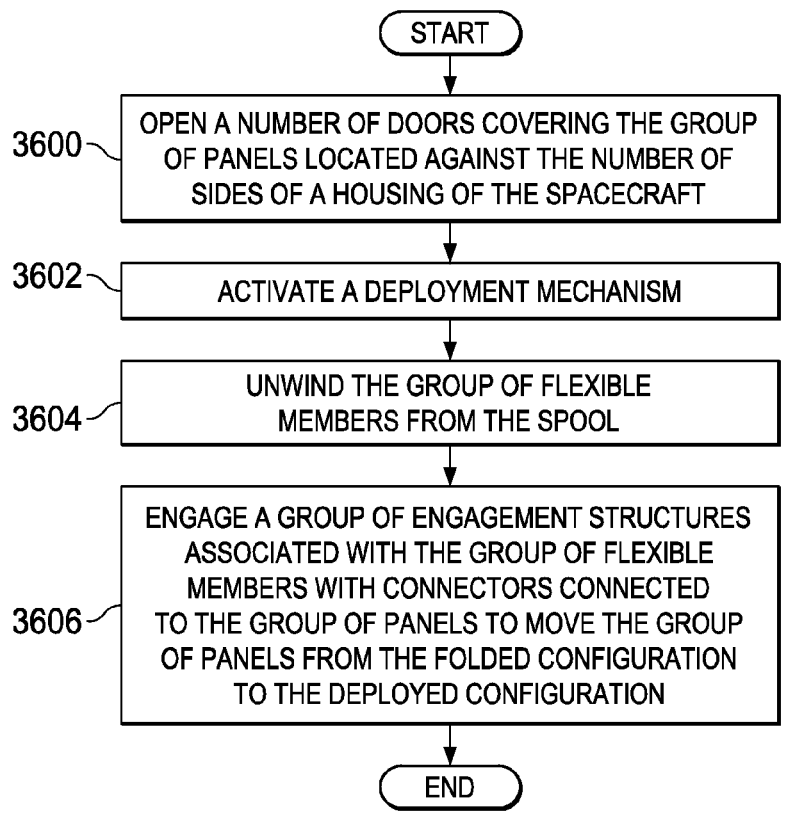
FIG. 36 is an illustration of a flowchart of a process for deploying a group of panels from a spacecraft in accordance with an illustrative embodiment.

Referring next to FIG. 36, an illustration of a flowchart of a process for deploying a group of panels from a spacecraft is depicted in accordance with an illustrative embodiment. The process described in FIG. 36 may be implemented using deployment system 210 in satellite 202 in FIG. 2.

The process begins by opening a number of doors covering the group of panels located against the number of sides of a housing of the spacecraft (operation 3600). The group of panels may be positioned in a folded configuration against a number of sides of the spacecraft.

Next, a deployment mechanism is activated (operation 3602). This deployment mechanism may include a torsion spring wound around a spool, or a motor, within a housing of the deployment system.

Thereafter, the group of flexible members is unwound from the spool (operation 3604). The group of flexible members is pushed out of a chamber in the deployment system when the deployment mechanism is activated.

The process then engages a group of engagement structures associated with the group of flexible members with connectors connected to the group of panels to move the group of panels from the folded configuration to the deployed configuration (operation 3606) with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 37:
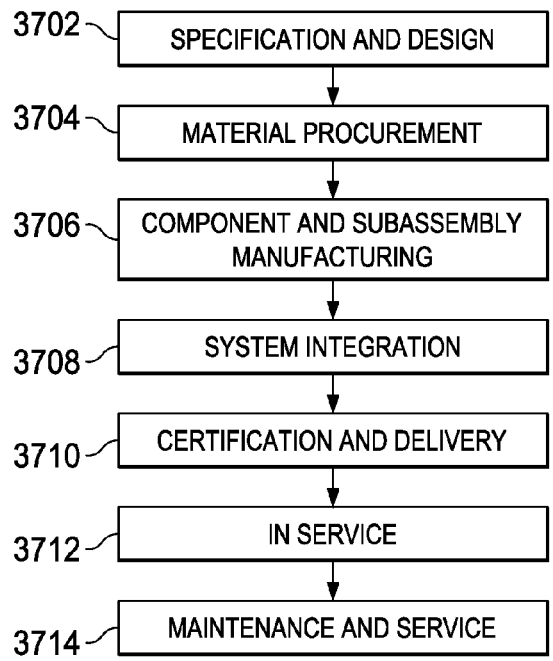
FIG. 37 is an illustration of a spacecraft manufacturing and service method in the form of a block diagram in accordance with an illustrative embodiment.
Figure 38:
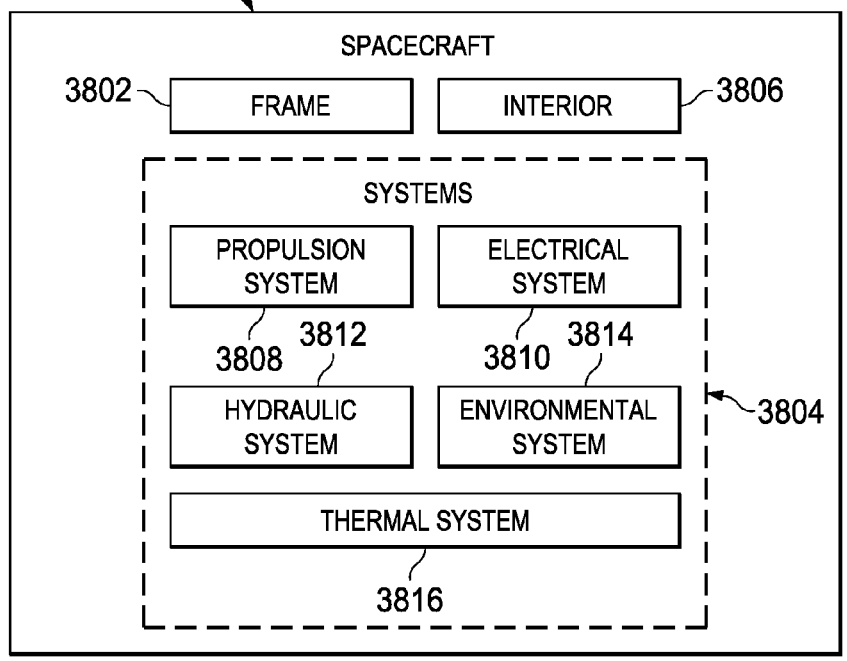
FIG. 38 is an illustration of a spacecraft in the form of a block diagram in which an illustrative embodiment may be implemented.

Illustrative embodiments of the disclosure may be described in the context of spacecraft manufacturing and service method 3700 as shown in FIG. 37 and spacecraft 3800 as shown in FIG. 38. Turning first to FIG. 37, an illustration of a spacecraft manufacturing and service method is depicted in the form of a block diagram in accordance with an illustrative embodiment. During pre-production, spacecraft manufacturing and service method 3700 may include specification and design 3702 of spacecraft 3800 in FIG. 38 and material procurement 3704. During production, component and subassembly manufacturing 3706 and system integration 3708 of spacecraft 3800 in FIG. 38 takes place. Thereafter, spacecraft 3800 in FIG. 38 may go through certification 3710 in order to be placed in service 3712. Certification 3710 may include meeting customer requirements, industry requirements, governmental requirements, or some combination thereof. While in service by a customer, spacecraft 3800 in FIG. 38 is scheduled for routine maintenance and service 3714, which may include modification, reconfiguration, refurbishment, and other maintenance or service.

Each of the processes of spacecraft manufacturing and service method 3700 may be performed or carried out by at least one of a system integrator, a third party, or an operator. In these examples, the operator may be a customer. For the purposes of this description, a system integrator may include, without limitation, any number of spacecraft manufacturers and major-system subcontractors; a third party may include, without limitation, any number of vendors, subcontractors, and suppliers; and an operator may be company, a military entity, a service organization, and so on.

With reference now to FIG. 38, an illustration of a spacecraft is depicted in the form of a block diagram in which an illustrative embodiment may be implemented. In this illustrative example, spacecraft 3800 is produced by spacecraft manufacturing and service method 3700 in FIG. 37. Spacecraft 3800 may include frame 3802 with a plurality of systems 3804 and interior 3806.

Examples of plurality of systems 3804 include one or more of propulsion system 3808, electrical system 3810, hydraulic system 3812, environmental system 3814, and thermal system 3816. Although an aerospace example is shown, different illustrative embodiments may be applied to other industries, such as the aircraft industry, the automotive industry, the ship industry, or other suitable industries.

Apparatus and methods embodied herein may be employed during at least one of the stages of spacecraft manufacturing and service method 3700 in FIG. 37. In particular, deployment system 210 from FIG. 2 may be implemented during any one of the stages of spacecraft manufacturing and service method 3700. For example, without limitation, deployment system 210 may be installed during at least one of component and subassembly manufacturing 3706, system integration 3708, routine maintenance and service 3714, or some other stage of spacecraft manufacturing and service method 3700. In another illustrative example, deployment system 210 is used to deploy components during in service 3712.

In one illustrative example, components or subassemblies produced in component and subassembly manufacturing 3706 in FIG. 37 may be fabricated or manufactured in a manner similar to components or subassemblies produced while spacecraft 3800 is in service 3712 in FIG. 37.

As yet another example, a number of apparatus embodiments, method embodiments, or a combination thereof may be utilized during production stages, such as component and subassembly manufacturing 3706 and system integration 3708 in FIG. 37. A number of apparatus embodiments, method embodiments, or a combination thereof may be utilized while spacecraft 3800 is in service 3712, during maintenance and service 3714, or both in FIG. 37. The use of a number of the different illustrative embodiments may substantially expedite the assembly of spacecraft 3800, reduce the cost of spacecraft 3800, or a combination thereof.

Thus, the illustrative embodiments provide a method and apparatus for deploying group of panels 224. In one illustrative embodiment, an apparatus comprises group of panels 224 in folded configuration 228 against number of sides 208 of spacecraft 201, group of flexible members 214 connected to group of panels 224, and interface system 216 associated with group of panels 224 and group of flexible members 214. Interface system 216 is configured to move group of panels 224 from folded configuration 228 to deployed configuration 230 when group of flexible members 214 is extended from spacecraft 201.

With the use of an illustrative embodiment, larger components may be stored and deployed from a satellite, as opposed to with some currently used systems. For example, when panels are folded and stored within the satellite, the surface area of the panels may be larger than the satellite. As compared to cantilevered solutions, where the panel size is limited by the size of the satellite, the illustrative embodiments provide a method and system capable of deploying larger panels than before. In other words, unlike some currently used systems, the size of the panels deployed from the satellite is not limited by the size of the satellite.

The illustrative embodiments also allow larger panels to be folded more efficiently with a reduced risk of damages to the components within the panels. For instance, with the use of solar panel 400 with first set of solar modules 410 and second set of solar modules 412, solar panel 400 may be folded and stored within a satellite in a manner that decreases the risk of damages to one of the solar modules.

In addition, deployment system 210 with group of flexible members 214 and interface system 216 provide a passive way to deploy group of panels 224 in a desired manner. As a result, the size of group of panels 224 stored within deployment system 210 may be increased compared to some currently used systems that have panels that unfold from the side of a satellite. Larger panels allow for more efficient operations to be performed by the satellite. Group of flexible members 214 and interface system 216 allow group of panels 224 to be extended in a desired manner such that each of group of panels 224 unfolds.

In other examples, when it is desirable for group of panels 224 to have an alternative configuration, deployment system 210 may be arranged in various positions within the satellite to deploy group of panels 224 as needed. For instance, when deploying a parabolic antenna, deployment system 210 is positioned at the top of the satellite and deploys components folded around the satellite.

Additionally, deployment system 210 provides a compact and light-weight deployment system that does not increase the weight of the satellite more than desired. Deployment system 210 may be implemented in various sizes of satellites without substantially increasing the weight of the satellite and in turn, increasing the cost of launching the satellite.

With the use of steering system 246, group of panels 224 deployed from satellite 202 may be maneuvered to track the sun, track objects of interest, increase drag during operations of satellite 202, or a combination thereof. As a result, group of panels 224 may receive a desired amount of solar radiation used to generate power to perform operations for satellite 202.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a panel in a folded configuration within a side of a spacecraft;
   a flexible member connected to the panel; and
   an interface system associated with the panel and the flexible member, wherein the interface system is configured to move the panel from the folded configuration to a deployed configuration when the flexible member is extended from the spacecraft, and the interface system comprises:
      a plurality of connectors associated with the panel and the flexible member, wherein each connector in the plurality of connectors comprises a channel and is configured to attach to the panel; and
      a plurality of engagement structures associated with the flexible member, wherein each engagement structure in the plurality of engagement structures is configured to engage with a corresponding connector in the plurality of connectors to move the panel from the folded configuration to the deployed configuration.

2. The apparatus of claim 1 further comprising:
   a spool within a housing of the spacecraft, wherein the flexible member is configured to be wound on the spool.

3. The apparatus of claim 1, wherein the panel is connected to the spacecraft by a number of contact points.

4. The apparatus of claim 1, wherein the panel is selected from one of a solar array, an antenna, and a drag device.

5. The apparatus of claim 1 further comprising:
   a steering system configured to steer the panel in space.

6. The apparatus of claim 1, wherein the interface system holds the panel substantially flat when the panel is in the deployed configuration.

7. The apparatus of claim 1 further comprising:
   a housing of the spacecraft, wherein the panel is located within a side of the housing when the panel is in the folded configuration; and
   a door located against a side of the housing and configured to cover the panel in the folded configuration and open such that the panel is moved from the folded configuration to the deployed configuration.

8. The apparatus of claim 1, wherein the flexible member is comprised of a structure with a cross-sectional shape selected from at least one of a round shape, a triangular shape, a rectangular shape, an irregular shape, or a hexagonal shape.

9. The apparatus of claim 1, wherein: when the flexible member is extended and the panel is in the deployed configuration, the flexible member circumscribes the panel.

10. The apparatus of claim 1, wherein the flexible member has two ends and the flexible member is attached to the spacecraft by the two ends.

11. The apparatus of claim 1 further comprising:
    a deployment mechanism configured to extend the flexible member from an interior of the spacecraft to an exterior of the spacecraft such that the panel moves from the folded configuration to the deployed configuration.

12. The apparatus of claim 11, wherein the deployment mechanism comprises at least one of a torsion spring or a motor within a housing of the spacecraft.

13. The apparatus of claim 1 further comprising:
    a movement system associated with the platform and configured to change an orientation of the platform to maneuver the panel and the flexible member in space after the panel is moved from the folded configuration to the deployed configuration.

14. The apparatus of claim 13 further comprising:
    a spring configured to reduce torque needed from the movement system to change the orientation of the platform.

15. The apparatus of claim 13, wherein the movement system is configured to tilt the panel and the flexible member by changing the orientation of the platform such that the panel and the flexible member have a desired orientation.

16. The apparatus of claim 15, wherein the movement system comprises an actuator configured to extend and retract such that the platform moves about a pivot point.

17. The apparatus of claim 16, wherein the movement system is configured to tilt the panel to receive a desired amount of electromagnetic signals.

18. An apparatus comprising:
    a panel in a folded configuration within a side of a spacecraft, wherein the panel includes a solar array comprising:
       a first set of solar modules configured to be folded along a longitudinal axis; and
       a second set of solar modules configured to be folded along a diagonal axis to form the folded configuration for the solar array;
    a flexible member connected to the panel; and
    an interface system associated with the panel and the flexible member, wherein the interface system is configured to move the panel from the folded configuration to a deployed configuration when the flexible member is extended from the spacecraft.

19. A method for deploying a panel, wherein the panel comprises a solar array including a first set of solar modules and a second set of solar modules, the method comprising:
    folding the first set of solar modules along a longitudinal axis;
    folding the second set of solar modules along a diagonal axis to form a folded configuration for the solar array;
    extending a flexible member from inside a spacecraft; and moving the panel from the folded configuration to a deployed configuration using an interface system such that the flexible member is extended from the spacecraft.

20. The method of claim 19 further comprising:
positioning the panel in the folded configuration within a side of the spacecraft.

21. The method of claim 19 further comprising:
winding the flexible member around a spool within a housing of a deployment mechanism;
activating the deployment mechanism; and
unwinding the flexible member from the spool when the deployment mechanism is activated.

22. A method for deploying a panel, the method comprising:
extending a flexible member from inside a spacecraft;
moving the panel from a folded configuration to a deployed configuration using an interface system such that the flexible member is extended from the spacecraft, wherein a plurality of connectors are connected to the panel and wherein each connector in the plurality of connectors has a channel; and
engaging a plurality of engagement structures associated with the flexible member with the plurality of connectors to move the-panel from the folded configuration to the deployed configuration.

23. An antenna system comprising:
a flexible rod associated with an antenna reflector panel, wherein the antenna reflector panel is in a folded configuration within a side of a satellite;
an interface system associated with the antenna reflector panel and the flexible rod, wherein the interface system is configured to move the antenna reflector panel from the folded configuration to a deployed configuration and the interface system comprises:
a plurality of connectors associated with the antenna reflector panel and the flexible rod, wherein each connector in the plurality of connectors comprises a channel and is configured to attach to the antenna reflector panel; and
a plurality of engagement structures associated with the flexible rod, wherein each engagement structure in the plurality of engagement structures is configured to engage with a corresponding connector in the plurality of connectors to move the panel from the folded configuration to the deployed configuration; and
a deployment mechanism configured to extend the flexible rod as the antenna reflector panel moves from the folded configuration to the deployed configuration.

24. The antenna system of claim 23, wherein the antenna reflector panel comprises reflective antenna arrays configured to reflect radio waves in a desired direction.

25. The antenna system of claim 23, wherein the satellite has a housing configured to be used as part of a structure of the antenna system.

26. The antenna system of claim 25 further comprising:
a plate configured to deploy from a top of the satellite and used to focus electromagnetic signals to the antenna system.

27. An antenna system comprising:
a parabolic antenna reflector in a folded configuration within a side of a satellite;
a flexible rod associated with the parabolic antenna reflector;
an interface system associated with the parabolic antenna reflector and the flexible rod, wherein the interface system is configured to move the parabolic antenna reflector from the folded configuration to a deployed configuration and the interface system comprises:
a plurality of connectors associated with the parabolic antenna reflector and the flexible rod, wherein each connector in the plurality of connectors comprises a channel and is configured to attach to the parabolic antenna reflector; and
a plurality of engagement structures associated with the flexible rod, wherein each engagement structure in the plurality of engagement structures is configured to engage with a corresponding connector in the plurality of connectors to move the parabolic antenna reflector from the folded configuration to the deployed configuration; and
a deployment mechanism configured to extend the flexible rod as the parabolic antenna reflector moves from the folded configuration to the deployed configuration.

28. The antenna system of claim 27, wherein the satellite is surrounded by the parabolic antenna reflector when the parabolic antenna reflector is in the deployed configuration.

29. The antenna system of claim 27 further comprising:
a structural rod attached to the parabolic antenna reflector and configured to deploy the parabolic antenna reflector with a desired shape.

30. The antenna system of claim 27 further comprising:
a solar panel against the side of a satellite, wherein the parabolic antenna reflector is stored in the folded configuration between the solar panel and the side of the satellite.

31. The antenna system of claim 30, wherein the solar panel is configured to unfold prior to moving the parabolic antenna reflector to the deployed configuration.

* * * * *

UNITED STATES PATENT AND TRADEMARK OFFICE
CERTIFICATE OF CORRECTION

PATENT NO. : 9,637,248 B2  
APPLICATION NO. : 14/198126  
DATED : May 2, 2017  
INVENTOR(S) : Cook et al.

Page 1 of 1

It is certified that error appears in the above-identified patent and that said Letters Patent is hereby corrected as shown below:

Column 26, Line 26, change "the platform" to -- a platform --

Column 27, Line 26, change "the-panel" to -- the panel --

Signed and Sealed this  
Twentieth Day of February, 2018

Andrei Iancu  
*Director of the United States Patent and Trademark Office*